May 4, 1948. B. T. LEVEQUE 2,440,722
SEWING MACHINE
Filed June 23, 1943 21 Sheets-Sheet 5
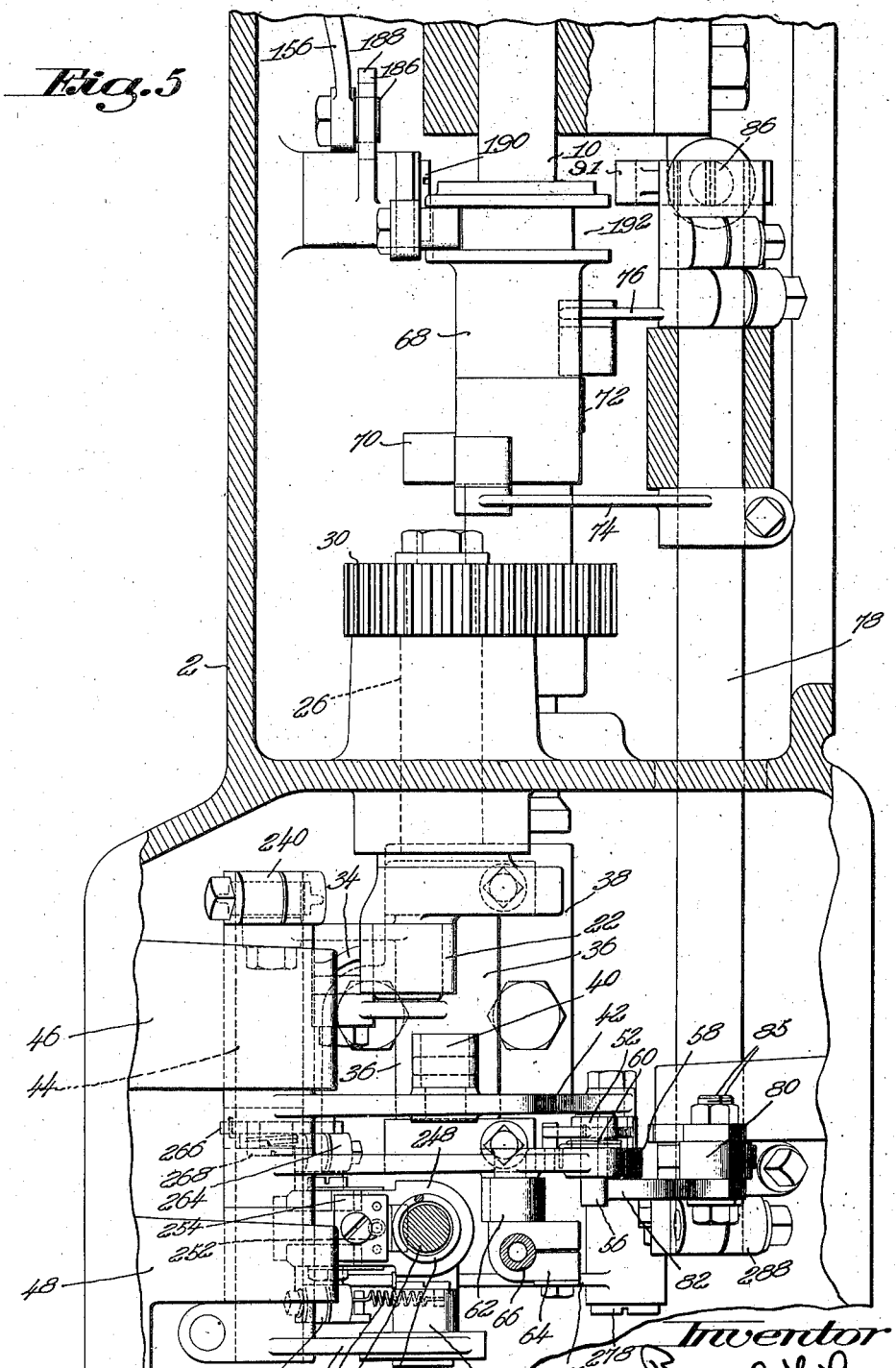

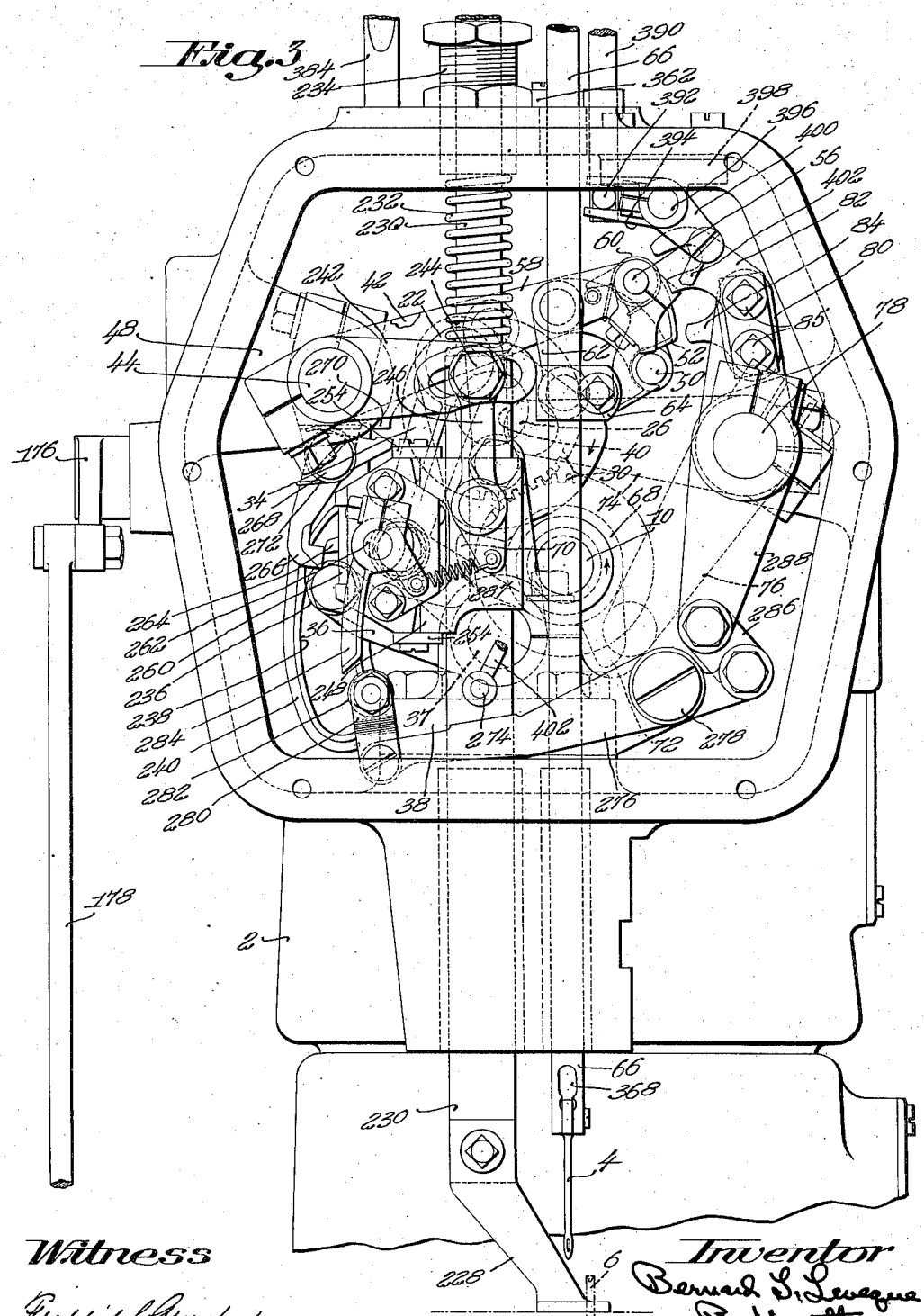

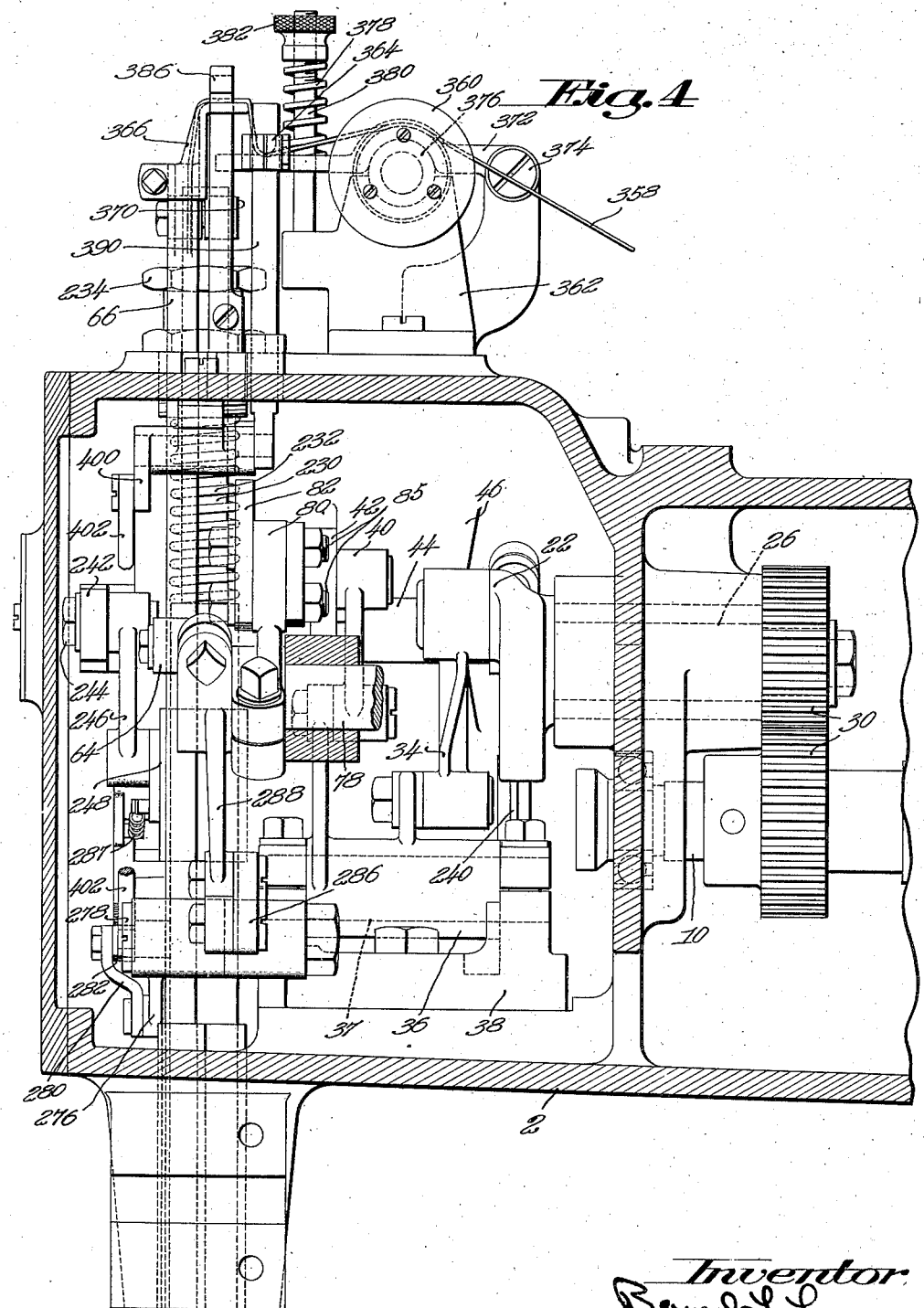

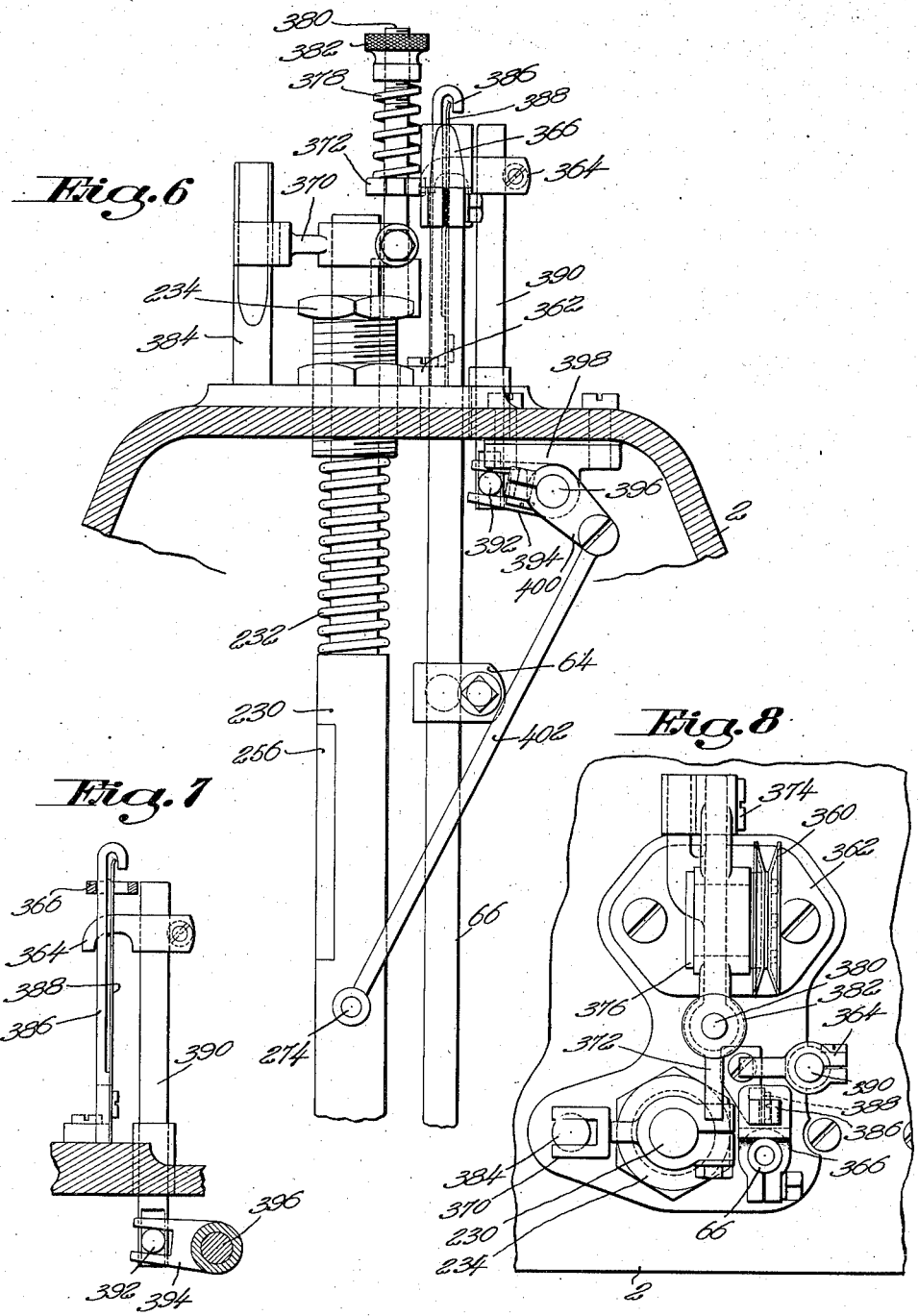

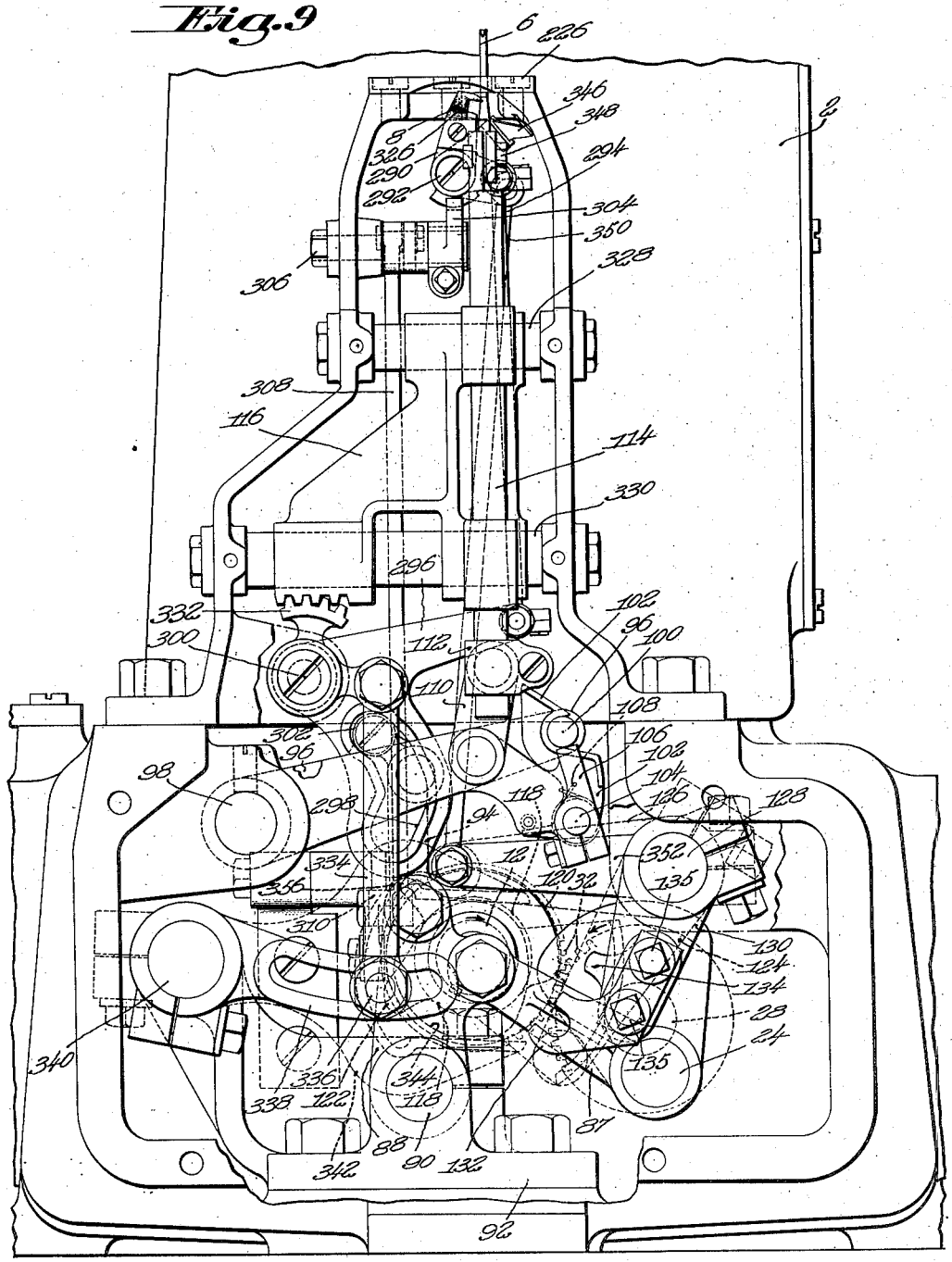

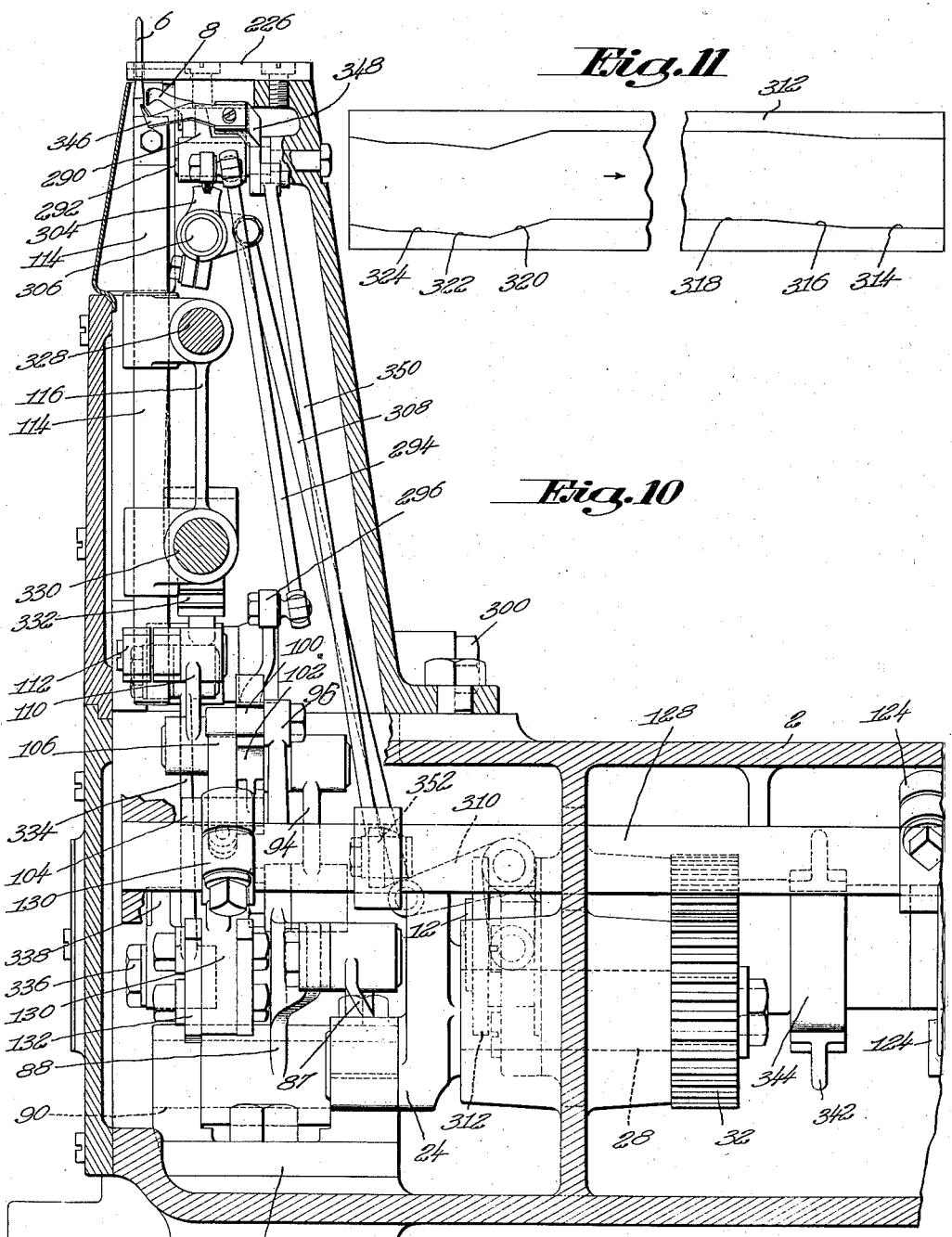

May 4, 1948.　　　B. T. LEVEQUE　　　2,440,722
SEWING MACHINE
Filed June 23, 1943　　　21 Sheets-Sheet 9

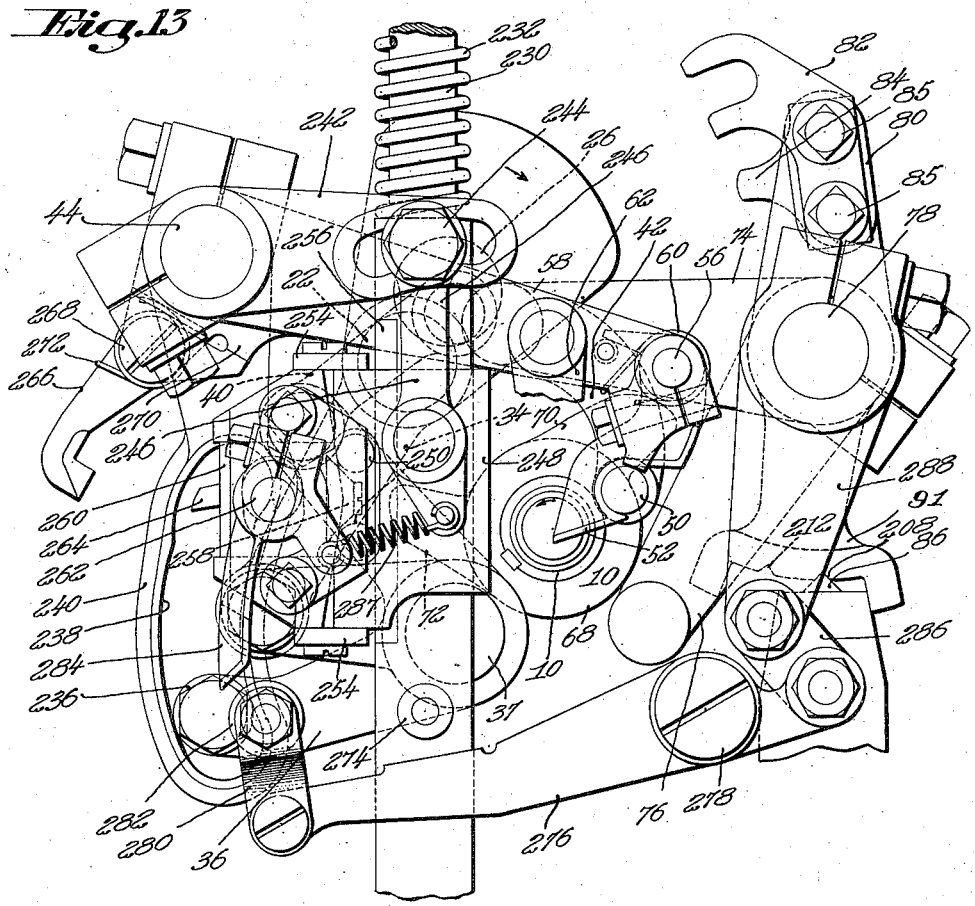

May 4, 1948.  B. T. LEVEQUE  2,440,722
SEWING MACHINE
Filed June 23, 1943  21 Sheets-Sheet 11
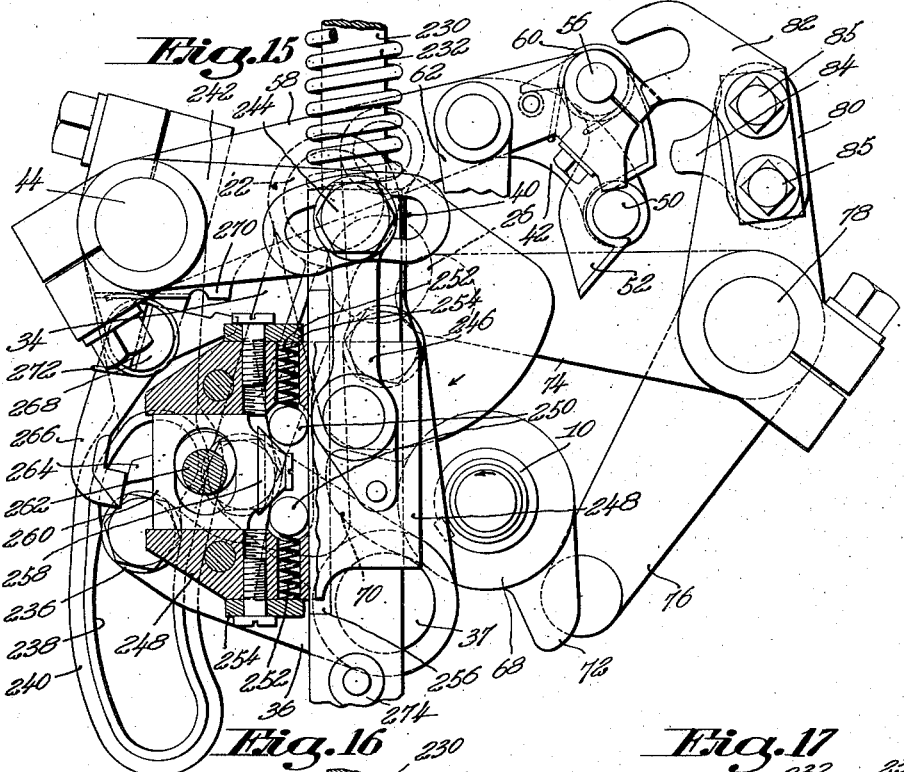
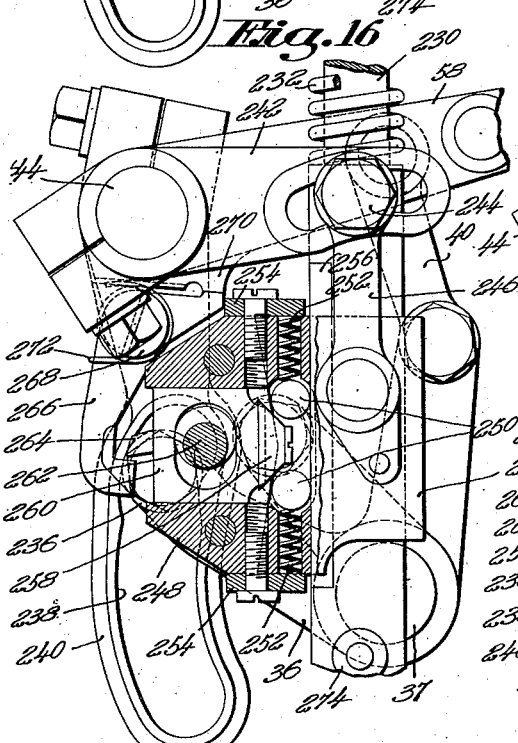
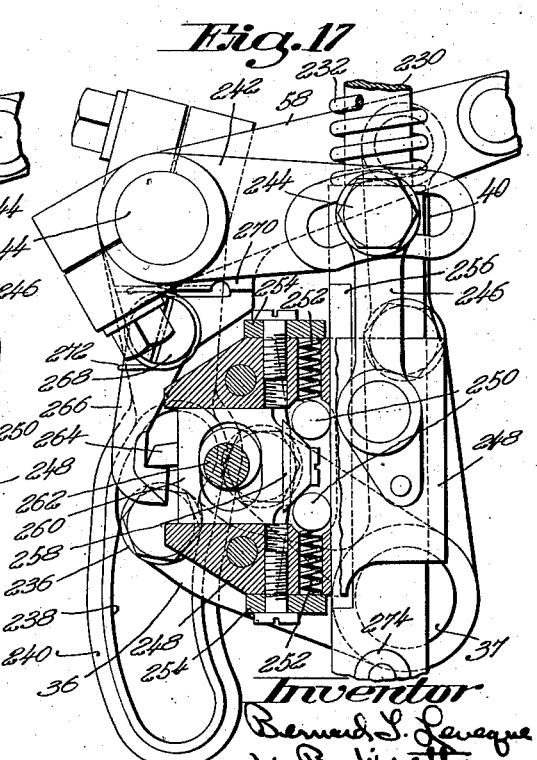
Inventor
Bernard T. Leveque
By his attorney

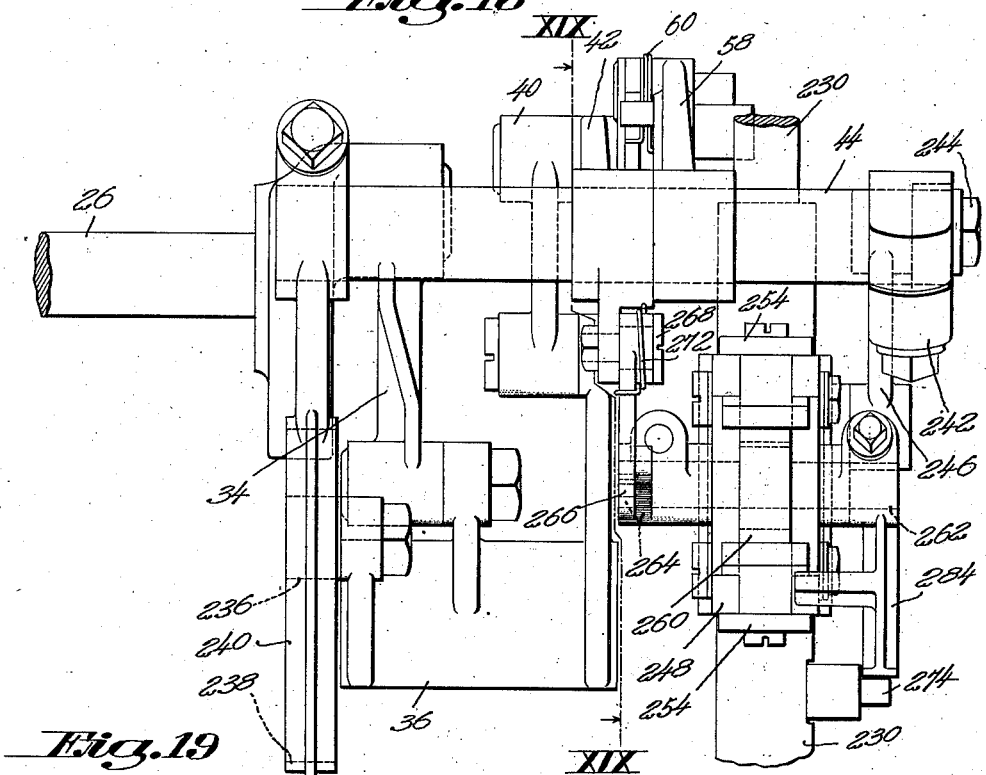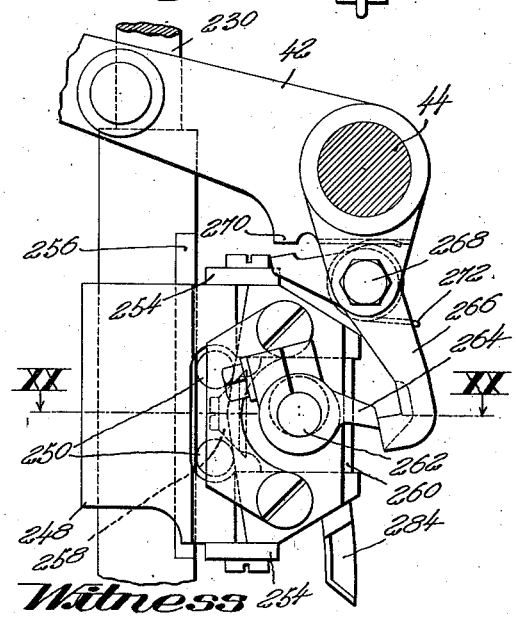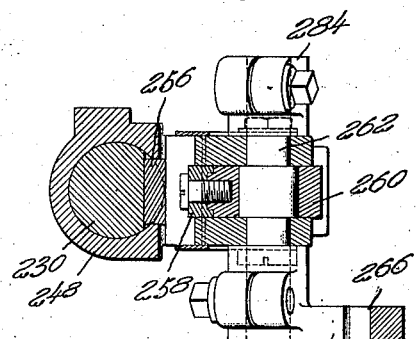

May 4, 1948.　　　B. T. LEVEQUE　　　2,440,722
SEWING MACHINE
Filed June 23, 1943　　　21 Sheets-Sheet 13
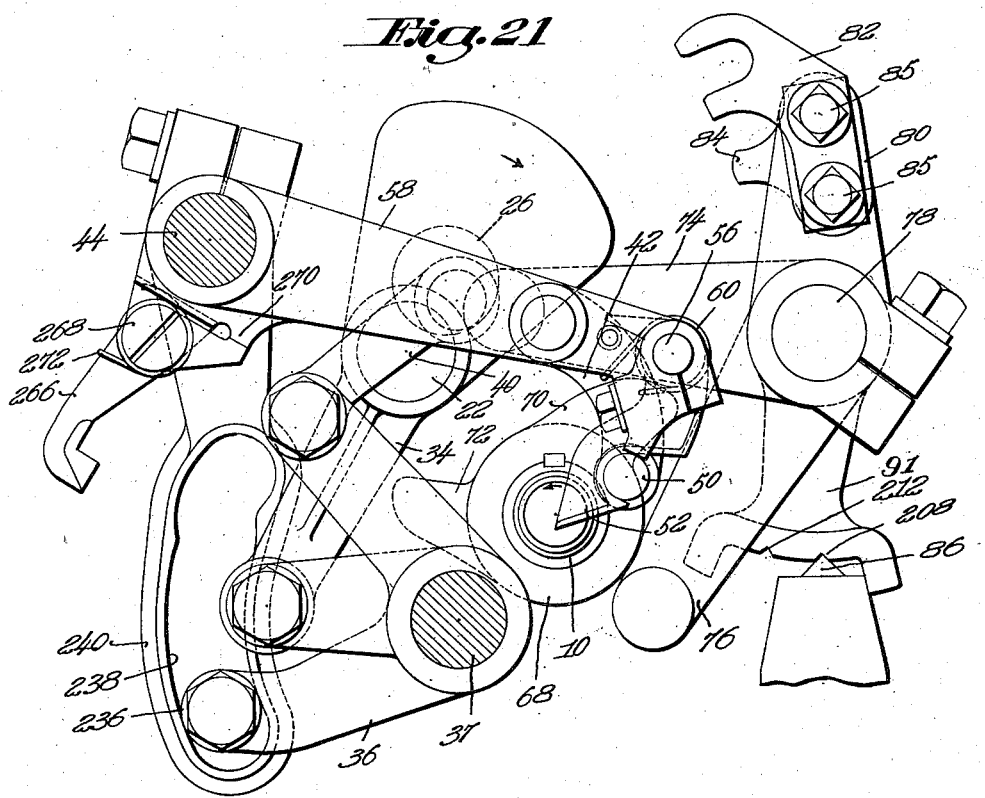
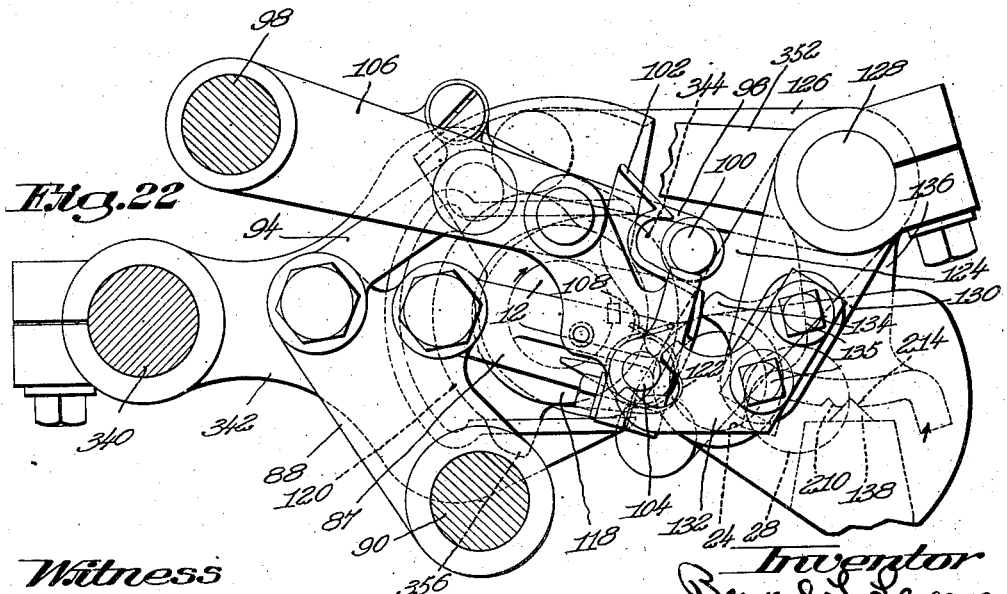

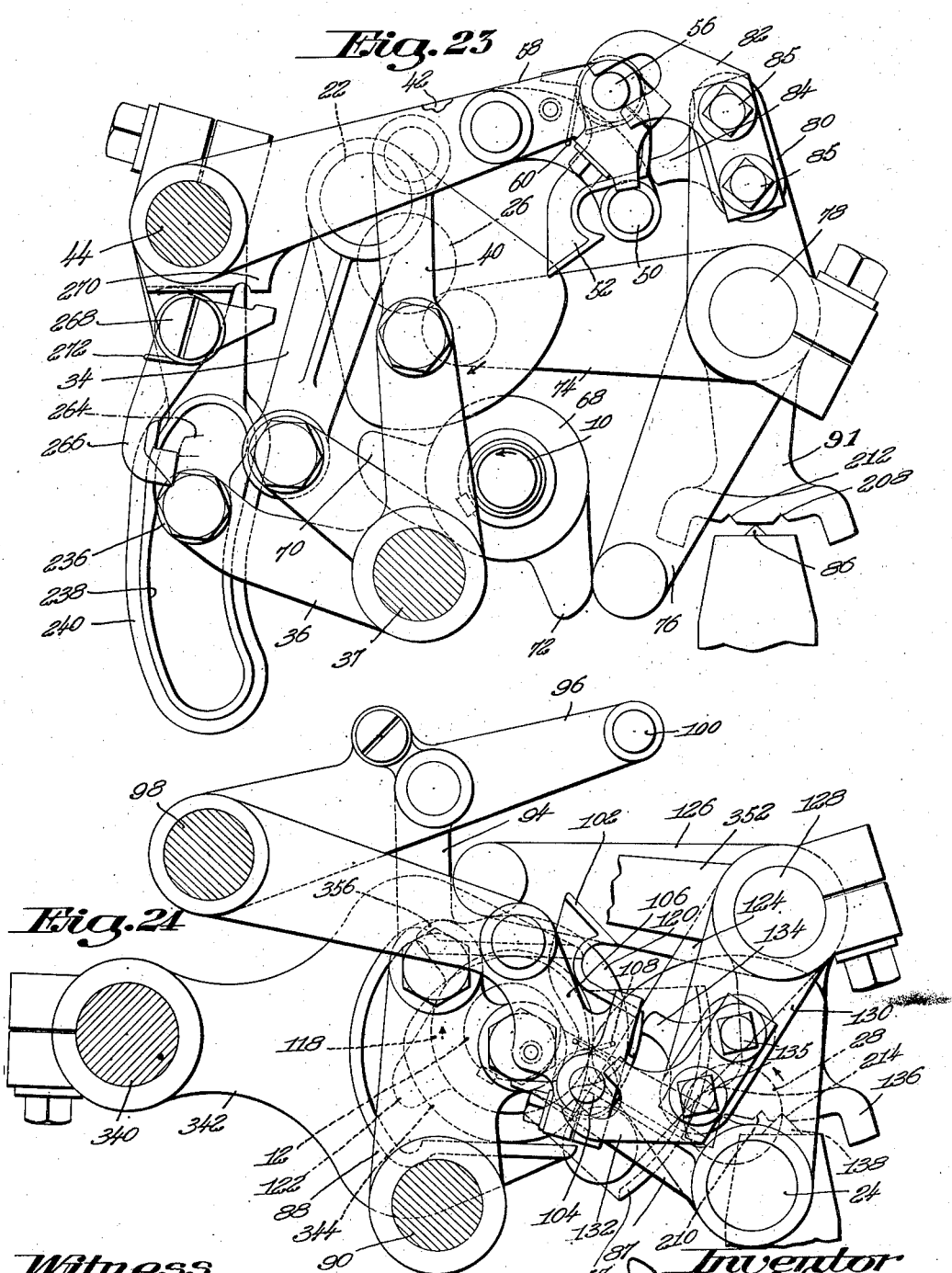

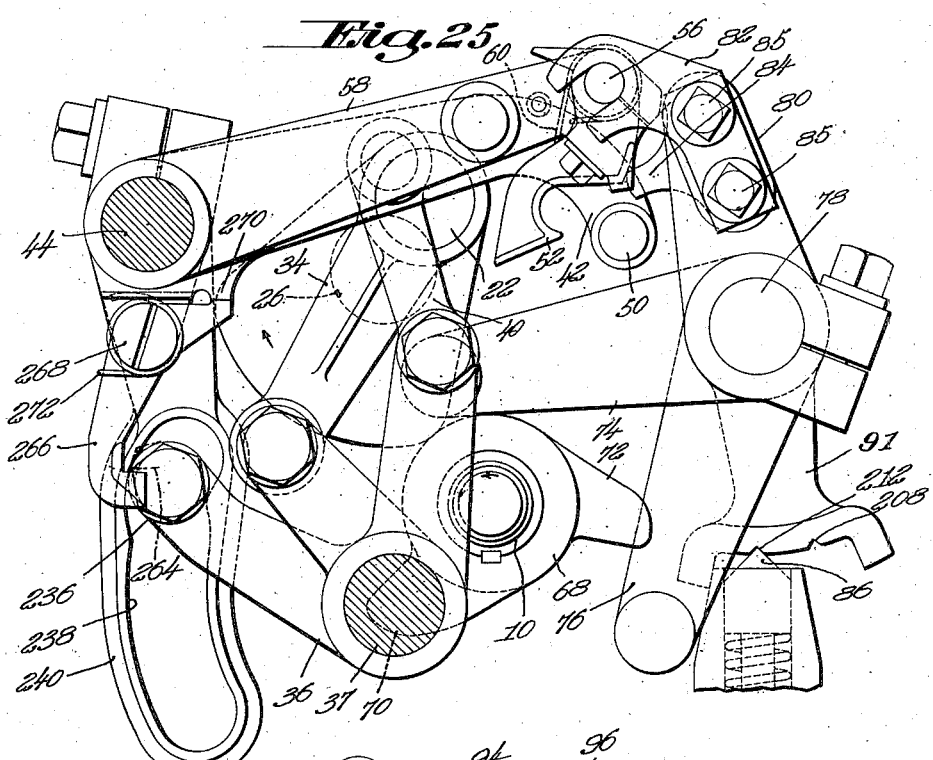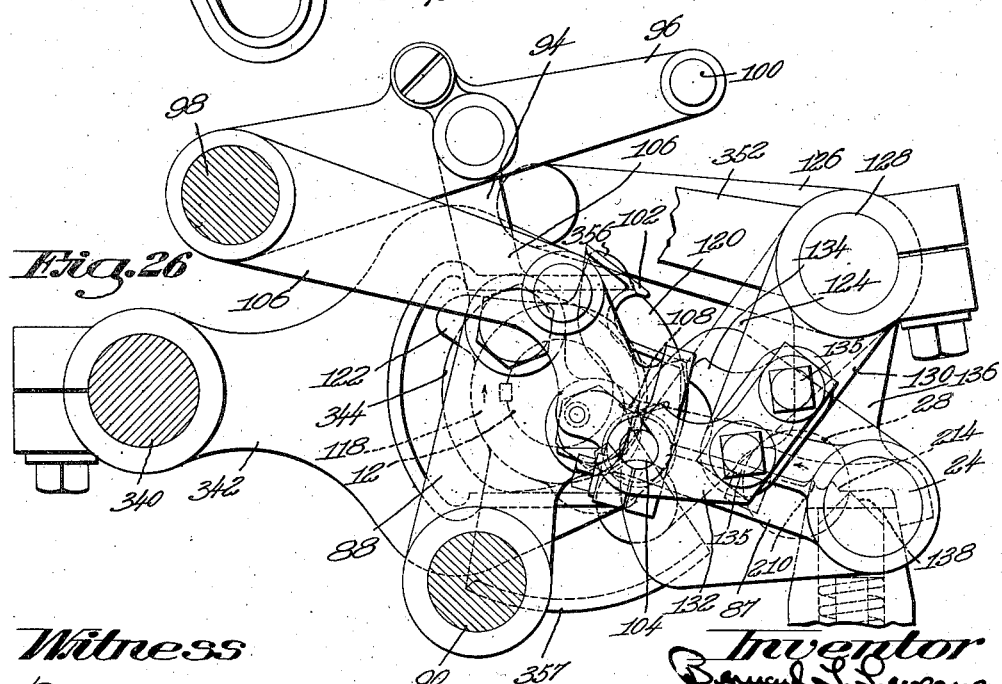

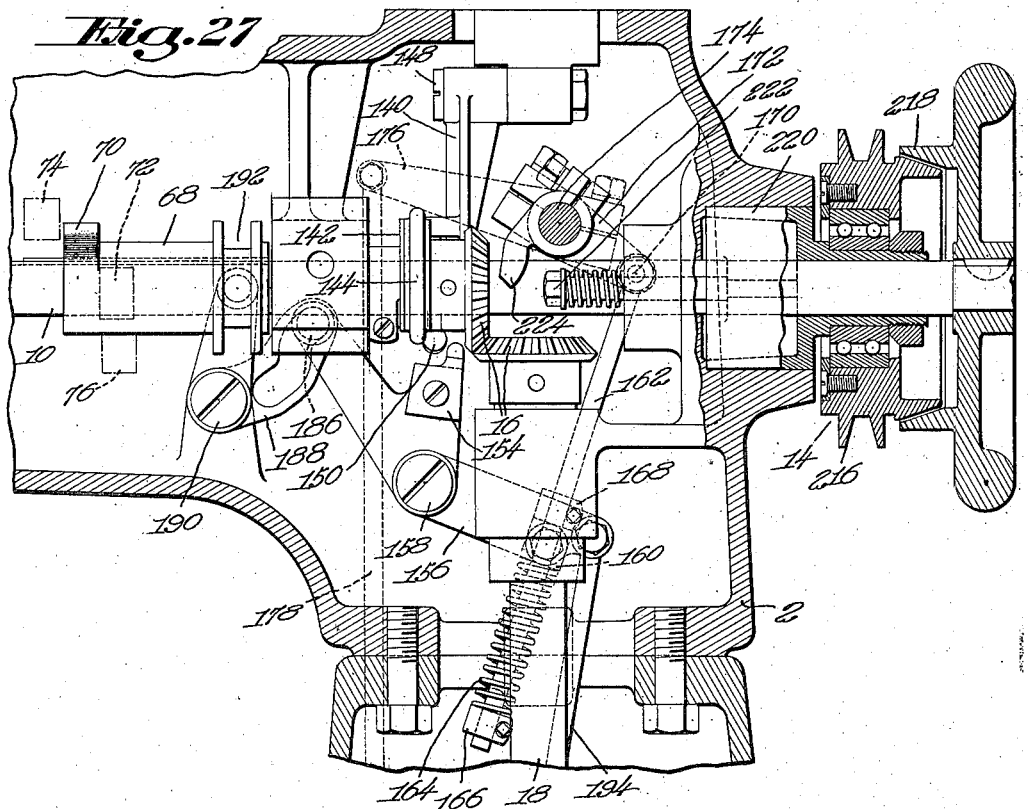
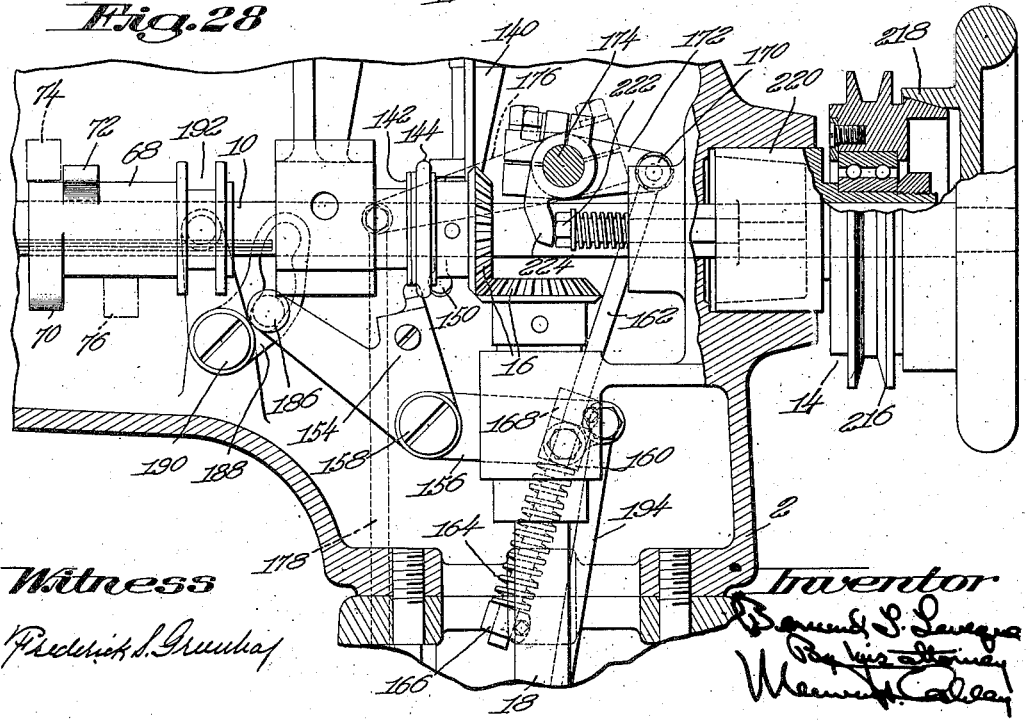

May 4, 1948. B. T. LEVEQUE 2,440,722
SEWING MACHINE
Filed June 23, 1943 21 Sheets-Sheet 17
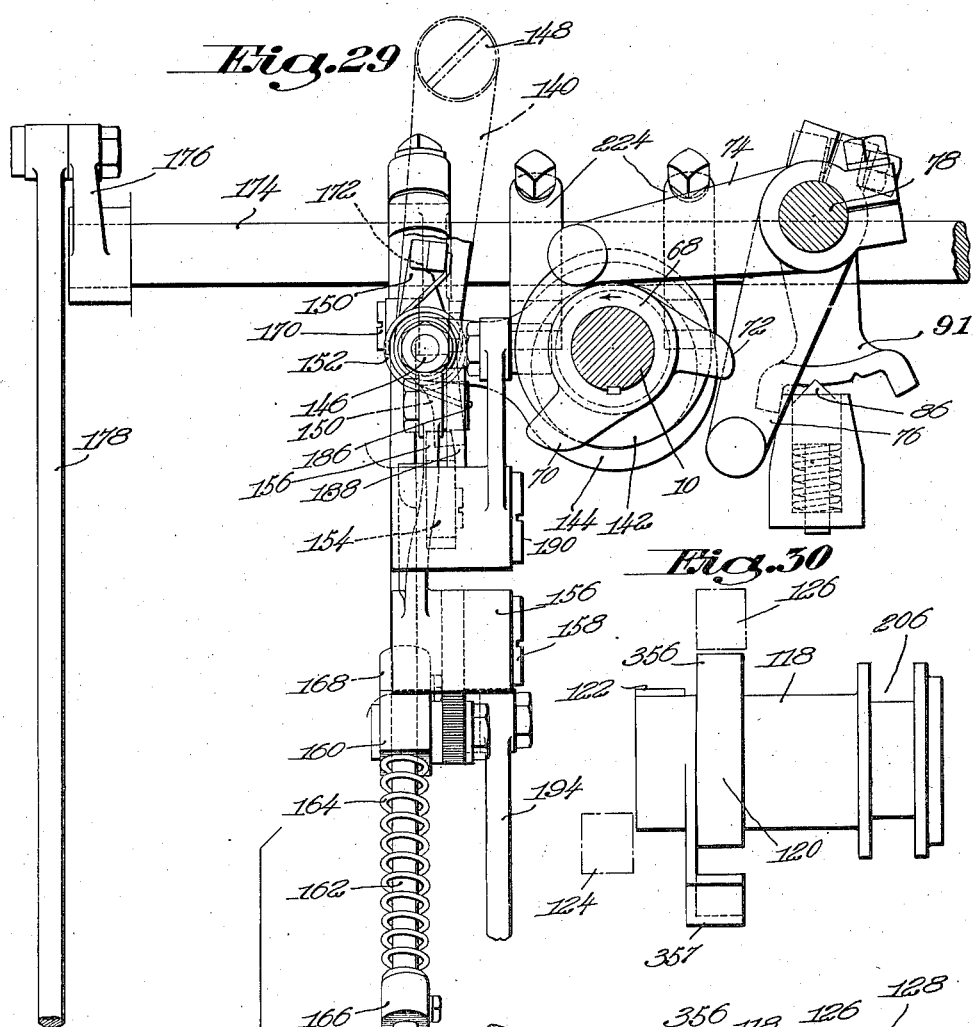

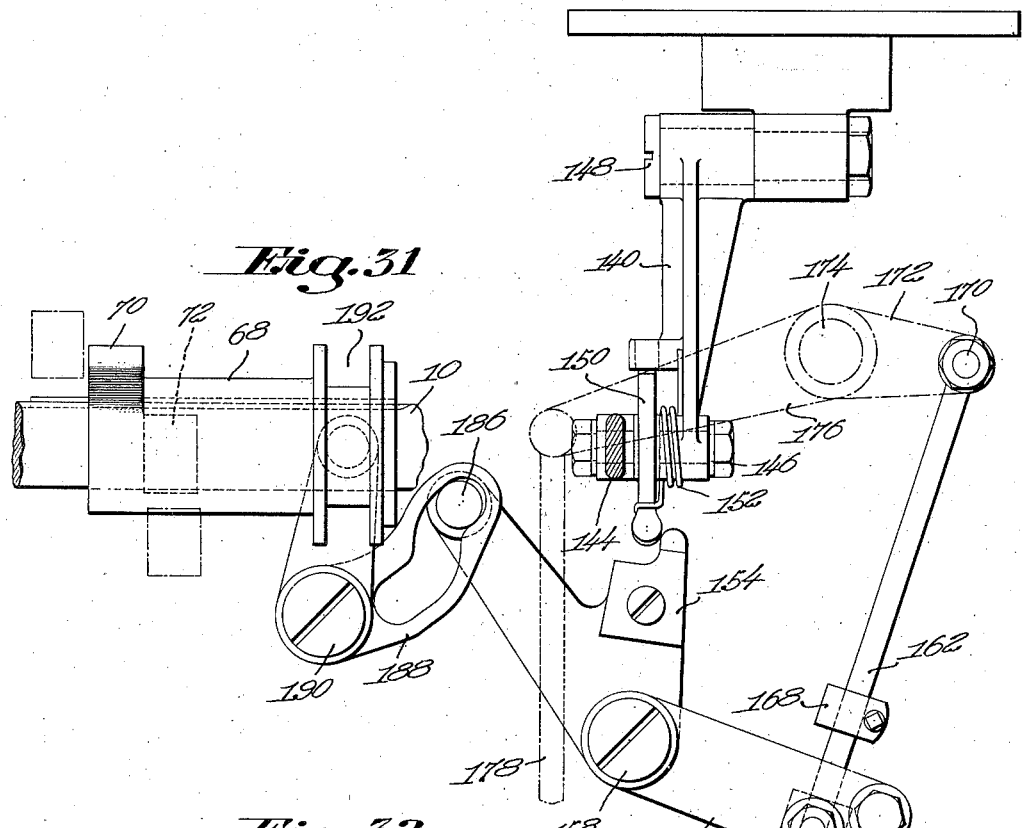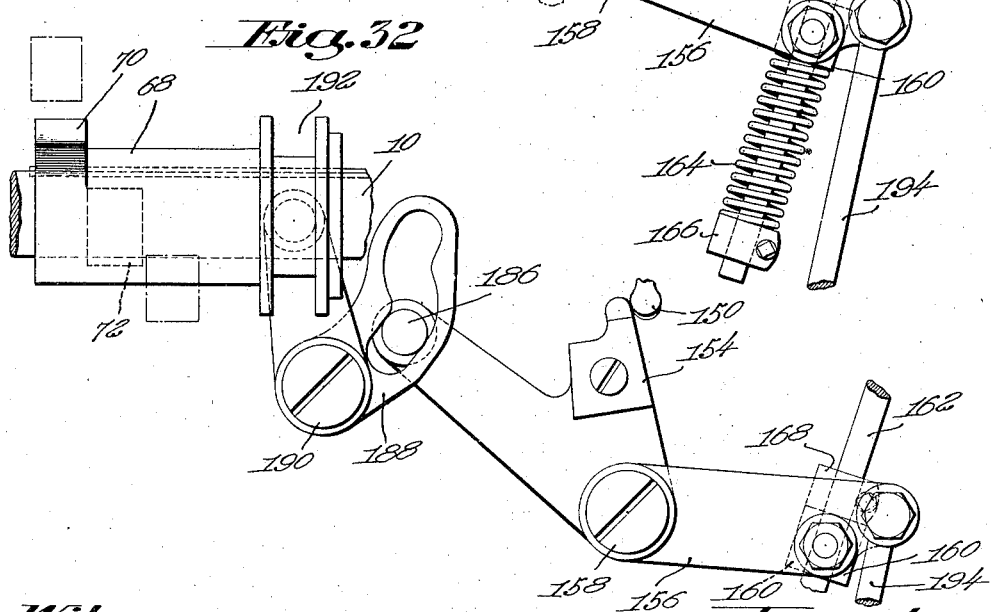

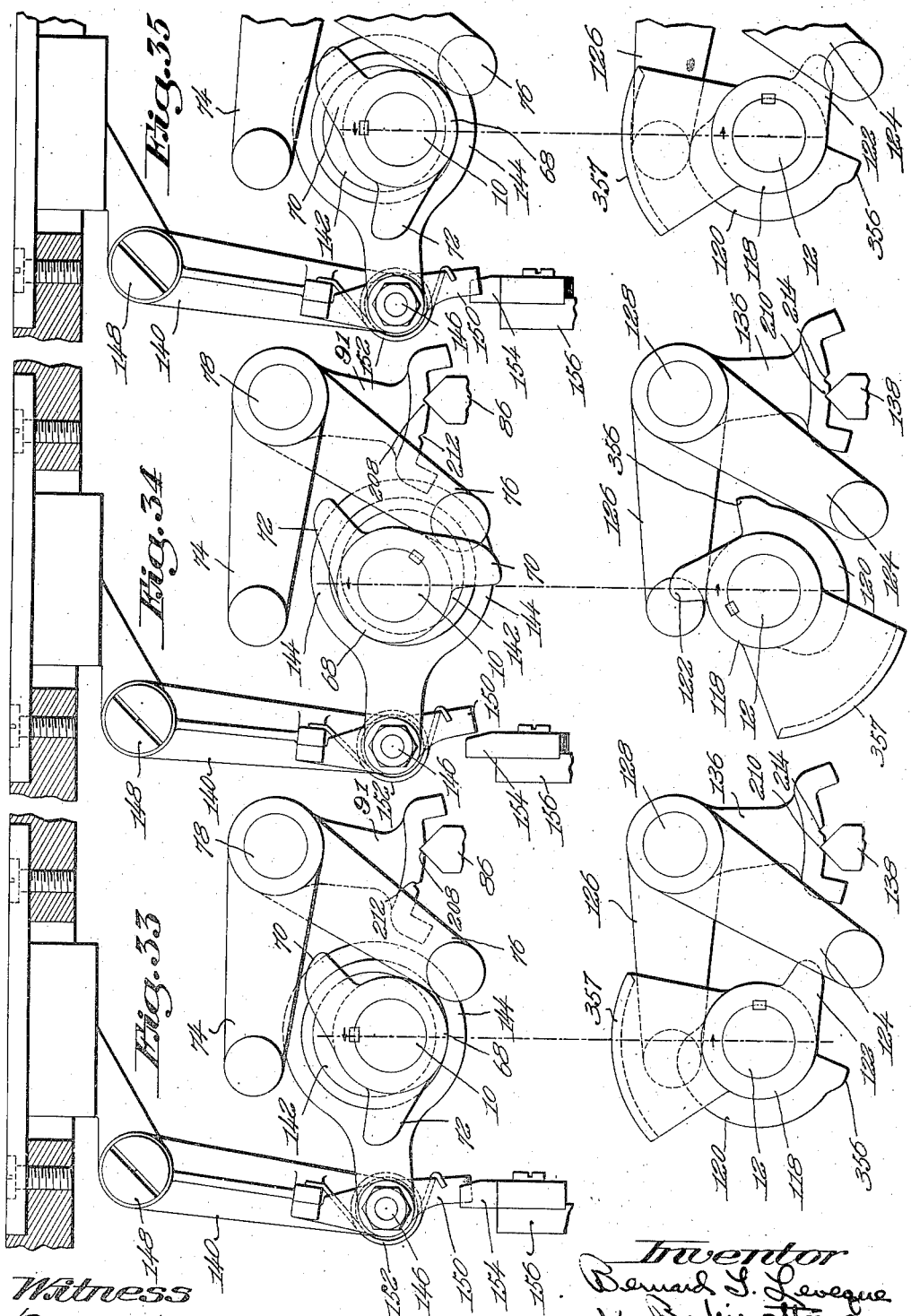

May 4, 1948.　　　　B. T. LEVEQUE　　　2,440,722
SEWING MACHINE
Filed June 23, 1943　　　21 Sheets-Sheet 20

Witness
Frederick S. Grumbas

Inventor
Bernard T. Leveque

May 4, 1948.  B. T. LEVEQUE  2,440,722
SEWING MACHINE
Filed June 23, 1943  21 Sheets-Sheet 21
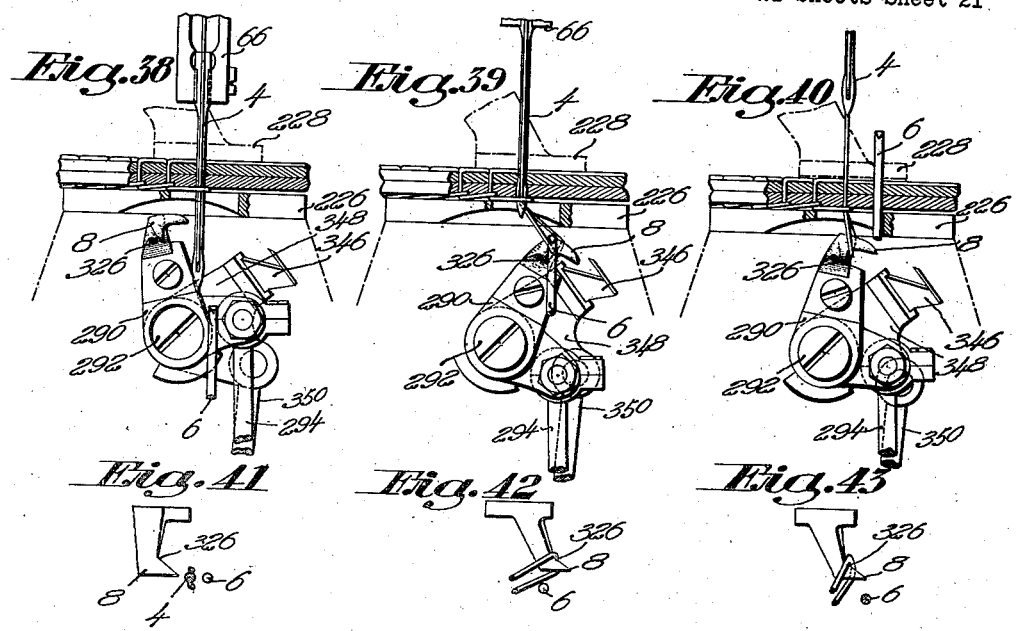
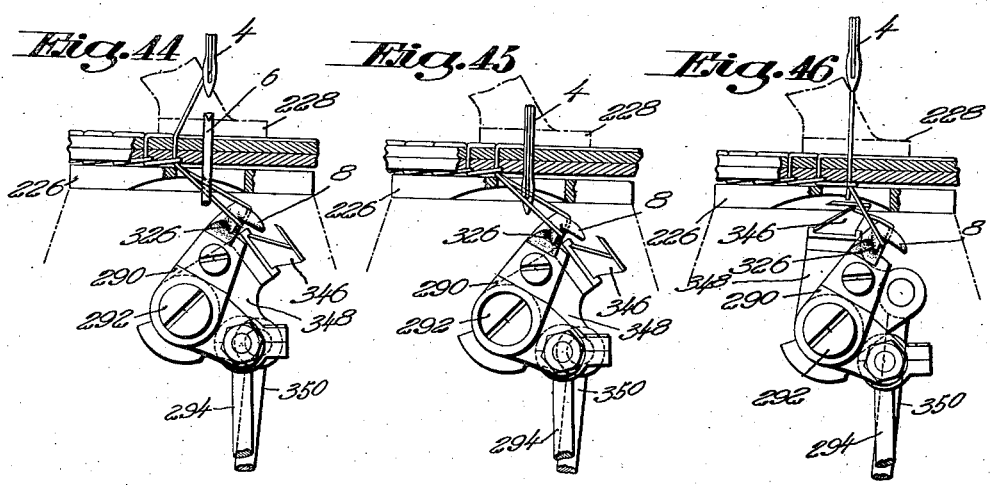

Patented May 4, 1948

2,440,722

UNITED STATES PATENT OFFICE 2,440,722

SEWING MACHINE

Bernard T. Leveque, Wenham, Mass., assignor to United Shoe Machinery Corporation, Boston, Mass., a corporation of New Jersey Application June 23, 1943, Serial No. 491,863

30 Claims. (Cl. 112—34)

The present invention relates to improvements in sewing machines for operating upon shoes or other articles composed of stiff, heavy materials and to driving and stopping mechanisms particularly useful with machines of the type disclosed in the present inventor's copending application for United States Letters Patent Serial No. 398,368, filed June 17, 1941, upon which Patent No. 2,352,274 was granted on June 27, 1944.

The machine of the copending application is provided with a reciprocating straight hook needle and a straight awl actuated by cranks on separate spaced operating shafts and by relatively simple connections having disconnectible elements for stopping the operation of the needle and awl while the crank shafts continue in motion. The needle of that machine has a thread-receiving hook and operates towards and from the work from beneath the work and laterally to feed the work, the feeding movement merging with the reciprocating movement towards and from the work.

In the design of a straight needle type of sewing machine, an important problem is in obtaining within the confines of a relatively small space a construction for moving the operating parts which may be enclosed completely or otherwise protected from accidental contact. If the outside dimensions of the machine, particularly in a horizontal direction from one side of the machine to the other, are bulky, the operator's line of vision or the light at the sewing point will be obscured to an objectionable extent and the nature of the work operated upon will be limited to materials of relatively flat nature or to straight edged types of work requiring no special attention to guide them through the machine. Bulky construction of a machine renders it extremely difficult to operate upon work having curved or angular outlines, as is often encountered when sewing shoes, small instrument cases and similar articles.

The objects of the present invention are to simplify and improve the operation of prior machines of this type, to provide a compact construction which will enable the use of an eye-pointed needle in place of the hook needle formerly employed and to improve the arrangement and operation of the actuating and feeding mechanisms, including disconnectible stopping connections, for the purpose of rendering the machine more effective when an eye-pointed needle is used and to obtain a more uniform operation and durable construction in the disconnectible connections for a stopping mechanism without increasing substantially the external dimensions of the frame or other enclosing structure. Further objects of the invention are to simplify and improve the effectiveness of driving and stopping mechanisms in other respects and generally to provide a machine which will sew heavy work and possess ability to operate above those speeds now in customary use without the exercise of special skill or careful manipulation on the part of the operator.

In the machine of the said copending application, the straight hook needle and awl are actuated from opposite sides of the work through separate trains of mechanism including disconnectible connections directly connected to pitmans driven from cranks on the ends of a pair of vertically spaced operating shafts, one in the base of the machine and the other in an arm of the frame overhanging the base. The disconnectible connections are so arranged that the awl is disconnected first, while the needle continues in operation to complete a final sewing cycle in a seam, after which the needle is disconnected and brought to rest. Control of the disconnectible connections is accomplished by a treadle and a continuously rotating slotted master timing disk secured to an operating shaft. When the treadle is actuated, movement of the disconnectible connections is prevented until a point in the final sewing cycle is reached in which the master timing disk frees the disconnectible connections and enables them to be actuated in a predetermined sequence, the master timing disk blocking the movement of the disconnectible connections at other times.

The illustrative machine, employing a needle which is eye-pointed, instead of hooked as in the said prior machine, requires, for the accomplishment of satisfactory sewing operations, modified needle and awl motions instead of those produced by directly connected crank and pitman connections, it being desirable to actuate the needle, together with the awl and other stitch-forming devices, through cycles of movements and with timed relationships not obtainable with crank and pitman connections alone. To this end, a set of motion-modifying links and levers is added to the crank and pitman connections disclosed in the said copending application.

To enable retention of the same, or provision for smaller, general outside dimensions for the illustrated machine frame, in which the trains of needle and awl actuating mechanism are mounted, without disadvantage in mechanical strength or speed of sewing, as compared to a construction of directly connected crank and pitman connections in the machine of the application referred to, according to an important feature of the present invention, the trains of needle and awl actuating mechanism comprise not only two spaced operating shafts but also a countershaft arranged in off-center relation to each operating shaft to transmit movement from each operating shaft to each work-penetrating instrument. With such an arrangement, each operating shaft may be located in each train of actuating mechanism to better advantage than heretofore considered possible with respect to other operating parts in the frame of the machine. With the use of off-center countershafts, no substantial unsymmetrical offsets are required in the frame laterally from the axes of the operating shafts nor any increases in the overall outside frame dimensions in any direction, as compared to the machine frame in the said application, particularly when elements movable to disconnect both the needle and awl are employed in each train of mechanism. Such an arrangement of the trains of needle and awl actuating mechanism also is of substantial benefit when, as in the illustrated machine, the frame comprises an oil-retaining casing having external dimensions comparable with those of machines not so enclosed.

To insure that the illustrated machine will operate smoothly at high speeds, both off-center countershafts are provided with cranks, the pitmans for which impart movement to suitable motion-modifying connections located in spaces conveniently available centrally of the machine frame at the ends of the operating shafts, no additional lateral extensions of the enclosing frame being required when such connections are used. The invention is applicable also to sewing machines actuated by mechanisms having cams, eccentrics, or other equivalent devices and, in certain respects, this feature is desirable for use in sewing machines where no motion-modifying connections other than cranks or cams are employed. Thus, this feature of the invention lends itself to improved constructions in certain instances whether the countershafts are crank or cam shafts.

Preferably, the motion-modifying connections are in the form of four-bar linkages connected between the pitmans and the work-penetrating instruments. In this instance, certain of the connecting links for one or both the needle and awl linkages are movable to disconnect these work-penetrating instruments from the pitman, and means is provided on the corresponding operating shaft or shafts for shifting one or both movable elements to cause the respective work-penetrating instrument to be connected or disconnected. Where both work-penetrating instruments are disconnectible, the corresponding movable elements are shifted at different times in each sewing cycle to enable the penetrating instruments to be brought to rest at opposite ends of their respective strokes with a wide gap between their points, so that the work may readily be removed from the machine, as in the machine of the said prior application.

As in the machine of the prior application, the means for shifting the movable disconnecting elements of the needle and awl actuating mechanisms in the illustrated machine comprises timing cams slidable on the operating shafts and, in order to prevent sliding movement of the timing cams in angular positions where contact between the cams and followers actuated thereby would be likely to cause breakage or other improper result, the present machine is provided with a vibrating member driven by one of the operating shafts to block the shifting movement except in a predetermined position of one of the work-penetrating instruments. The present vibrating member performs a function equivalent to that of the continuously rotating slotted timing disk employed in the machine of the said prior application, an advantage of the vibrating member being that the speed of relative movement at the instant of blocking contact with the vibrating member may be substantially reduced, as compared to the speed of relative movement at the instant of blocking contact between the timing disk of the said application and the corresponding blocked part while the disk is rotating towards blocking position. With a vibrating member, blocking contact can occur near the position of reverse movement at one end of the stroke only where the actual movement is restarting and is at a relatively slow rate so that little or no impact will result between an edge of the vibrating member as it approaches the part being blocked. In order to insure positively against breakage from impact between the vibrating member and the blocked part, in the illustrated form of this feature, the vibrating member carries a spring-pressed finger cooperating with a lug on a set of yielding connections actuated by a treadle-controlled rod for sliding the timing cams from one operative position on the sewing shafts to another.

It is the usual practice in the construction of a sewing machine having an eye-pointed needle to provide a looper or loop taker at the side of the work opposite the needle. If an awl is employed at the side of the work with the loop taker and particularly if the awl is actuated to feed the work, it is difficult to prevent the awl from cutting or injuring the thread received from the needle by the loop taker, since the loop taker must not only engage the thread on the needle to form a loop but must hold the loop in a position during the succeeding stroke of the needle where it will be entered by the needle so as to be enchained with the succeeding needle loop. For this reason, the use of a work-feeding awl with an eye-pointed needle has been avoided heretofore except where the awl is mounted to operate from the same side of the work as the needle.

When a machine is provided with an awl operating from the opposite side of the work from the needle, particularly when the awl acts to feed the work as well as to form a perforation for the needle, it is desirable to maintain as small a gap between the needle and awl as possible consistent with practical factors of safety and limitations of convenient mechanical construction. According to the best practice, the needle should enter the work as the awl is withdrawing, to insure entry of the needle within the awl perforation. Also, to reduce to a minimum the possibility of slippage or undesired movement of the work, the awl should re-engage the work at a point a stitch length from the needle before the needle withdraws. For a machine of the shoe-sewing type requiring an awl, this result can be obtained if the gap between the needle and awl points is not greater than the thickness of the thinnest work operated upon, or in the neighborhood of an eighth of an inch. Such short spacing between the needle and awl renders extremely difficult the problem of avoiding engagement between each loop of needle thread and the point of the awl and yet of bringing the loop into a position where it will be entered with certainty by the needle. For stiff, heavy work, it is common practice to sharpen the awl with a chisel edge rather than a central conical point, so that even a glancing engagement of one corner only of the chisel edge on the awl may sever one or all of the fibers in the thread.

An important object, therefore, of the present invention is to overcome the difficulties above referred to and to provide a high-speed sewing machine capable of operating upon heavy work in which a work-penetrating awl acts at one side of the work opposite to an eye-pointed needle, the awl forming perforations for the needle and preferably acting to feed the work.

To the accomplishment of this object, the loop taker contemplated by the present invention acts at the side of the work with the awl, to enter each loop of needle thread while the needle engages the work and to carry the loop received from the needle out of the path of the awl before the awl enters the work. Thereafter, the loop taker is actuated to bring the loop into the path of the needle as the awl withdraws from the work so that the needle will enter the preceding loop of thread. In the illustrated form of the machine embodying this improvement, the loop taker carries the loop of thread transversely of the direction of feed before the needle has withdrawn from the work and, after the awl enters the work in each sewing cycle, the loop taker moves the loop in the reverse direction so that one side of the loop is brought into actual contact with and is deflected against the side surface of the awl. As the awl continues to withdraw, it holds the side of the loop deflected until the point of the awl is reached, the other side of the loop extending at an angle to the deflected side and remaining out of contact with the awl. When the point of the awl passes the deflected thread, the tension in the thread is sufficient to snap it instantaneously to the opposite side of the needle and awl path through the gap between the needle and awl points, bringing the loop into alinement with the needle. By operating the loop taker in this way, it is possible so to time the movements of the needle and awl that there is an extremely short gap between them as the awl withdraws and the needle enters the work. Such timing of the needle and awl is desirable in that it insures accurate entry of the needle within the awl perforation and assists materially in control of the work and uniformity of stitching particularly while sewing along curved outlines. In order to prevent the point of the needle from contact with the opposite side of each needle loop after the loop is carried into alinement with the needle in the present machine, the loop taker is provided with a loop-entering point and a shoulder at the root of the point arranged to support the first-mentioned side of a needle loop at a different level from that of the second-mentioned side of the loop. When deflected, the first side of the loop engages the awl at a position lower than the level of the second side of the needle loop and, by the time the awl point has cleared the first side of the loop, the needle point has passed beyond the second-mentioned side, so that stranding or other injury to the thread is avoided. In addition to these features, still other features of the invention are embodied in certain constructions, combinations and arrangements of parts hereinafter described and claimed, the advantages of which will be readily understood from the following detailed description.

Referring to the drawings,

Fig. 3 is a front view, on an enlarged scale, of a portion of the machine illustrated in Fig. 1 with the front cover removed, exposing the needle and presser-foot actuating mechanisms;

Fig. 4 is a view of the same portion of the machine, taken in vertical section, to illustrate the operating drive and countershafts;

Fig. 5 is a plan sectional view of the same portion of the machine;

Fig. 6 is a sectional detail view, as seen from the front, of the needle and presser-foot actuating bars, together with connections for actuating a pull-off device and a tension wheel release mechanism;

Fig. 7 is a further detail sectional view, in front elevation, of the pull-off device;

Fig. 8 is a plan view of the pull-off device and tension wheel release mechanism;

Fig. 9 is a view in front elevation of the lower portion of the machine, partly broken away, and with cover plates removed, to expose the awl, looper and thread-cutter actuating mechanisms including disconnectible connections for the awl;

Fig. 10 is a side sectional view, looking from the right, of the same portions of the machine illustrated in Fig. 9;

Fig. 11 is a detail view of the looper-shifting cam, indicating the curvatures of the track developed on a plane surface;

Fig. 13 is a detail front view of the presser-foot actuating mechanism in a position taken during sewing operations, with the presser foot locked against the work;

Fig. 14 is a detail front view of part of the mechanisms illustrated in Fig. 13 in positions after the machine has stopped and the presser foot lifted from engagement with the work to enable the work to be removed;

Fig. 15 is a similar detail view of the parts illustrated in Fig. 13 taken during the sewing operations, with the presser foot still locked against the work but about to be raised to permit the work to be fed a stitch length;

Fig. 16 is a similar view of the same parts taken while the presser foot is being lowered against the work;

Fig. 17 is a similar view of the same parts, illustrating the positions with the presser foot unlocked so that it may adjust itself yieldingly to the thickness of the work;

Fig. 18 is a detail view in left side elevation of the parts illustrated in Fig. 15;

Fig. 19 is a detail view, looking from the rear of the presser-foot lock, taken along the line XIX—XIX of Fig. 18;

Fig. 20 is a sectional view of the pressure-foot bar and lock taken along the line XX—XX of Fig. 19;

Fig. 21 is a front detail view of the needle-actuating mechanism with the parts in positions assumed while sewing and while the disconnectible element of the connections is in connected position;

Fig. 22 is a similar view of the awl-actuating mechanism with the parts in corresponding sewing positions but with the disconnectible element in disconnected position;

Fig. 23 is a front detail view of the needle-actuating mechanism, illustrating the parts in positions while the disconnectible element is being actuated to disconnect the needle;

Fig. 24 is a similar view of the awl-actuating mechanism, illustrating the parts in positions assumed at the same time the needle is being disconnected as illustrated in Fig. 23;

Fig. 25 is a front detail view of the needle-actuating mechanism after the needle has been disconnected and brought to rest;

Fig. 26 is a similar view of the awl-actuating mechanism in a corresponding position;

Fig. 27 is a sectional view of the upper rear portion of the machine, including the needle-timing cam and the treadle connections and blocking means, with the parts in stopping positions;

Fig. 28 is a similar view of the same parts of the machine in sewing positions;

Fig. 29 is a detail front view of the treadle-actuating connections and the blocking means, illustrating their relation to the needle and awl-timing cams when the machine is stopped;

Fig. 30 is a detail side view of the awl-timing cam, indicating its relation to the control lever, as illustrated in Fig. 29;

Fig. 31 is a detail side view of the awl-timing cam, looking from the right, with the treadle connections in stopping positions and blocked;

Fig. 32 is a similar view of the same parts, taken during sewing, with the treadle connections blocked;

Fig. 33 is a view in front elevation and partial section of the needle and awl-timing cams illustrating the position of the parts while sewing, with the treadle connections blocked;

Fig. 34 is a similar view of the same parts in sewing positions but with the treadle connections unblocked;

Fig. 35 is a similar view of the same parts taken with the machine about to be stopped by the timing cams, the treadle connections being blocked;

Fig. 38 is a detail view on an enlarged scale of the needle and looper, illustrating their operative positions, taken during sewing in the positions of Fig. 36;

Fig. 39 is a similar view after the looper has received a loop of thread from the needle and while the needle is being retracted from the work;

Fig. 40 is a similar view, illustrating the positions of the looper and needle after the awl has entered the work to start the formation of a new stitch, the looper having moved to avoid the awl and to carry the loop of needle thread out of the path of the awl;

Figs. 41 to 43, inclusive, are plan detail views, illustrating the same parts in positions corresponding to those of Figs. 38 to 40, inclusive;

Fig. 44 is a view similar to that of Fig. 40 but with the parts in positions taken subsequently to those of that figure, the awl having fed the work a stitch length;

Fig. 45 is a similar view of the same parts after the awl has been disengaged from the work and the point of the needle has entered the loop;

Fig. 46 is a similar view of the same parts, illustrating the manner in which the thread cutter engages the thread during the final sewing cycle of a seam;

Figure 1:
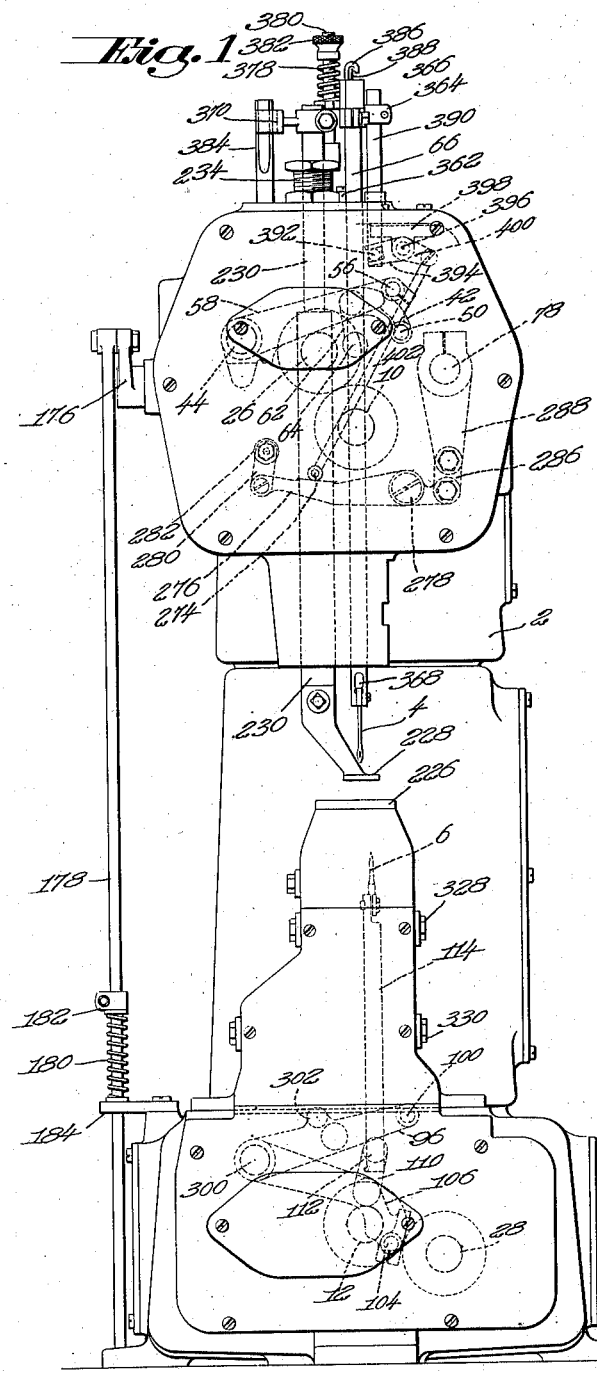
Fig. 1 is a view in front elevation of a machine embodying the features of the present invention.

Figs. 47 to 49, inclusive, are plan views of the same parts, illustrating the respective positions corresponding to those in Figs. 44 to 46, inclusive; and Fig. 50 is a view similar to those of Figs. 47 to 49, taken at a time in the sewing cycle between Figs. 47 and 48 while the looper is shifted to cause one side of the needle loop to be deflected by the awl.

The sewing machine illustrated in the drawings is a chainstitch, eye-pointed, straight-needle machine having a straight awl operating from below and the needle from above the work. A work-feeding movement is imparted to the awl while engaging the work to advance the work a stitch length. To form a loop in the thread carried by the needle and hold the loop in position during the succeeding sewing cycle for the entry of the needle, the machine is equipped with an oscillating and axially shiftable pointed loop taker acting at the same side of the work with the awl, all of the stitch-forming devices being driven from a main driving clutch and parallel operating shafts through cams, cranks, pitmans and other suitable connections, as in the machine of inventor's copending application above identified. To facilitate lubricating the machine, the operating and driving mechanisms are entirely enclosed by an oil-retaining hollow supporting frame, or casing, 2, having at its upper portion an overhanging arm and at its lower portion a base, within which arm and base are arranged oiling means including an oil pressure pump and spray and drip delivery jets (not shown).

Figure 2:
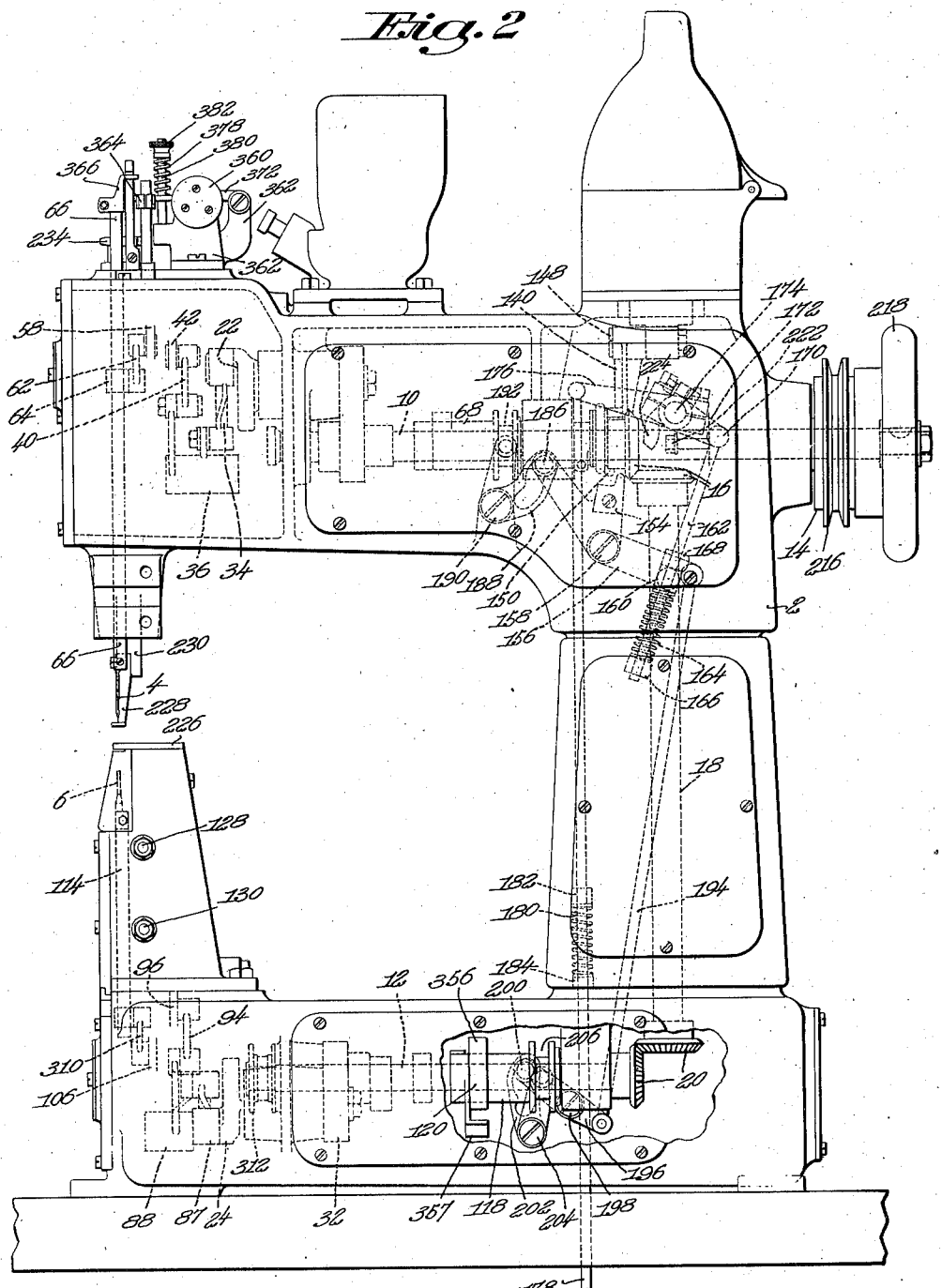
Fig. 2 is a view in side elevation, looking from the right, of the machine illustrated in Fig. 1.

In the illustrated machine, the needle is shown at 4, the awl at 6, the looper or loop taker at 8 (see Figs. 9, 36 and 37, among others) and the operating shafts comprising main sewing and auxiliary shafts at 10 and 12 in the frame and base positions (see Figs. 2, 4 and 10). The operating shafts are driven in unison from a main clutch 14 on the shaft 10, suitable bevel gears 16 on the shaft 10 and on a vertical shaft 18 and other bevel gears 20 on the vertical shaft 18 and operating shaft 12.

In the machine of the said prior application, the needle and awl are actuated directly by simple crank-driven mechanisms, the cranks for which are formed on the outer ends of the operating shafts. The corresponding cranks in the illustrated machine are indicated at 22 in Fig. 4 and 24 in Fig. 10, respectively. The present machine, being equipped with an eyepointed needle in place of the hook needle of the prior machine, requires for satisfactory sewing operations a somewhat different timed relationship for the needle and awl during each sewing cycle. In order to enable the needle and awl to operate with a gap between their points as short as possible, and to insure a uniform feeding movement to be imparted to the work by the awl, the awl is caused to dwell at the upper end of its work-penetrating stroke so that the work is engaged by the stiffest part of the awl as close as possible to the socket in which it is received and secured. For convenience, a similar dwell is provided simultaneously in the movement of the needle, while disengaged from the work, to avoid any possible interference with the awl. Simultaneous dwells in the movements of the awl and needle during work feed contribute to a smoothly operating sewing cycle for the machine and enable substantial simplification of construction and design in actuating mechanisms for the stitch-forming devices. For providing simultaneous dwells in the needle and awl movements, the illustrated machine is provided with trains of mechanisms, including similar motion-modifying connections to actuate both the needle and awl in place of the directly acting connections of the said prior hook-needle machine and, also, due to the desirability of maintaining a relatively small operating gap between the needle and awl, it is necessary to separate the needle and awl points when the machine is stopped, so that the work may readily be removed and new work substituted, as in the machine of the said prior application. The needle and awl-actuating connections in the illustrated machine, as in the machine of the application, therefore, include elements movable to disconnect both the needle and awl and to bring them to rest at the opposite ends of their respective reciprocating strokes.

As has been stated, the motion-modifying connections of the present machine have been embodied in a construction which enables their enclosure within an oil-tight casing without requiring outside dimensions substantially greater than those of the prior machine, so that the operator's line of vision and the general illumination at the sewing point is not obstructed, and one feature of the present invention, contributing materially to this end, comprises the use of countershafts 26 and 28, respectively, for the needle and awl-actuating mechanisms mounted in off-center parallel relation to the operating shafts 10 and 12. The countershafts are driven from the corresponding operating shafts through spur gears, 30 for the needle and 32 for the awl, mounted on the operating and countershafts. The countershafts, therefore, are provided with the cranks 22 and 24 rather than the operating shafts themselves, as in the prior machine. The timed relation of the cranks remains the same as that in the prior machine, except for reverse rotation, but the rotating paths of the cranks are so disposed that each train of mechanism may be centered about the axes of the respective operating shafts, enabling full-length reciprocating strokes to be imparted to the work-penetrating instruments through motion-modifying links and levers of minimum length and weight between the operating shafts and the work-penetrating instruments. Such use of off-center countershafts also assists materially in the proper design of effective motion-modifying connections and in convenient locations, not only for easy accessibility, but also for structural strength of the supporting studs and shafts about which the levers comprising the motion-modifying connections oscillate on the frame of the machine. Further, the use of off-center shafts provides a better opportunity to arrange effectively the disconnectible elements and their actuating and timing devices within the respective actuating mechanisms, as will be described more fully hereinatfer.

Referring more particularly to Figs. 3 to 5, inclusive, the train of needle-actuating mechanism comprises, in addition to the countershaft 26 with its crank 22, a pitman 34, one end of which surrounds the crank, and the other end of which is pivotally connected to one arm of a three-armed lever 36 fulcrumed on a shaft 37 secured between spaced supports on a bracket 38 mounted within the upper portion of the machine frame. Another arm of the three-armed lever 36 is connected through a link 40 to a curve driving lever 42 fulcrumed on a central portion of a horizontal rockshaft 44 loosely supported in bearings formed in lugs 46 and 48 projecting inwardly of the machine frame. When the machine is stopped, the driving lever 42 is free to oscillate without imparting any reciprocating movement to the needle but during sewing, a pin 50 carried by the curved end of the lever 42 is engaged by the lower hooked inner end of a latch link 52 pivoted on a pin 56 secured at the end of of a needle-actuating lever 58 clamped to the shaft 44. To maintain the latch link in engagement with the pin 80, a spring 60 is coiled around a hub on the link and acts to swing the link in a counterclockwise direction. The lever 58 is in turn pivotally connected through a short link 62 to a block 64 secured on a hollow, vertical, reciprocating needle-supporting bar 66, the bearings for which are in the frame, so that the bar projects downwardly to provide a socket for the needle 4 and upwardly to enable the movements of the needle bar to be imparted to a thread pull-off device, to be described.

The driving lever 42, link 40 and the arm of the three-armed lever 36 to which the link is connected form, together with the frame of the machine, a four-bar linkage, acting in one set of positions as a toggle, the end pivots of which comprise the fulcrum shaft 37 and the pivotal connection of the link 40 with the driving lever 42 (see Fig. 25). When the central joint of the toggle is brought into alinement with its end pivots (Fig. 23), there is a dwell in the reciprocating movement of the needle, the needle being at the upper end of its stroke. This dwell occurs while the awl is feeding the work so that the awl may be projected a substantial distance into the work with the shank of the awl just below the under surface of the work. The shifting mechanism for the needle latch link 52 is so timed that the latch link is moved to unlatching position while the needle is at the upper end of its stroke during the dwell in its movement, thus enabling disconnection to take place while there is little or no force being applied by the needle-actuating mechanism and while there is ample time for the latch link to be shifted towards or from engagement with the pin 50 on the actuating lever 42.

For driving the mechanism for shifting the needle latch link 52 to connect or disconnect the needle, a timing cam 68 is keyed to but slidable along the needle-operating shaft 10 (see Fig. 5). The needle timing cam 68 is formed with axially spaced start and stop surfaces 70 and 72 cooperating with a pair of stop and start control arms 74 and 76, each respectively clamped to a needle-controller shaft 78 mounted in suitable bearings at the right and above the operating shaft 10. The needle control arms 74 and 76 are spaced sufficiently along the shaft 78 to prevent engagement of more than one arm at a time with the cam 68. At the outer end of the needle-controller shaft 78 is a shift lever 80, the upper end of which is provided with a slotted locking piece 82 and a latch finger 84 clamped by bolts 85 to opposite sides of the shift lever 80. The bolts 85 pass through enlarged perforations in the shift lever to enable the positions of the locking piece and shifting finger to be adjusted conveniently when the bolts are loosened. The latch-shifting finger is so located that, when the actuating lever 42 is in its highest position, counterclockwise movement of the shift lever will cause the latch-shifting finger to engage the latch link 52 and swing the latch link clear of the pin 50, thus disconnecting the needle bar from its actuating mechanism. At the same time, the slotted piece 82 engages the outer end of the pin 56 to hold stationary the needle-actuating lever 58 and the needle bar connected thereto, in their highest positions. To hold the needle-controller shaft 78 and shift lever 80 in either starting or stopping position, the rearward end of the shaft has clamped to it a notched segmental arm 91 having projecting fingers to engage the sides of a hollow base in the machine frame, within which a spring-pressed plunger 86 slides to enter the notches, to be described more fully below, in the arm 91.

Figure 12:
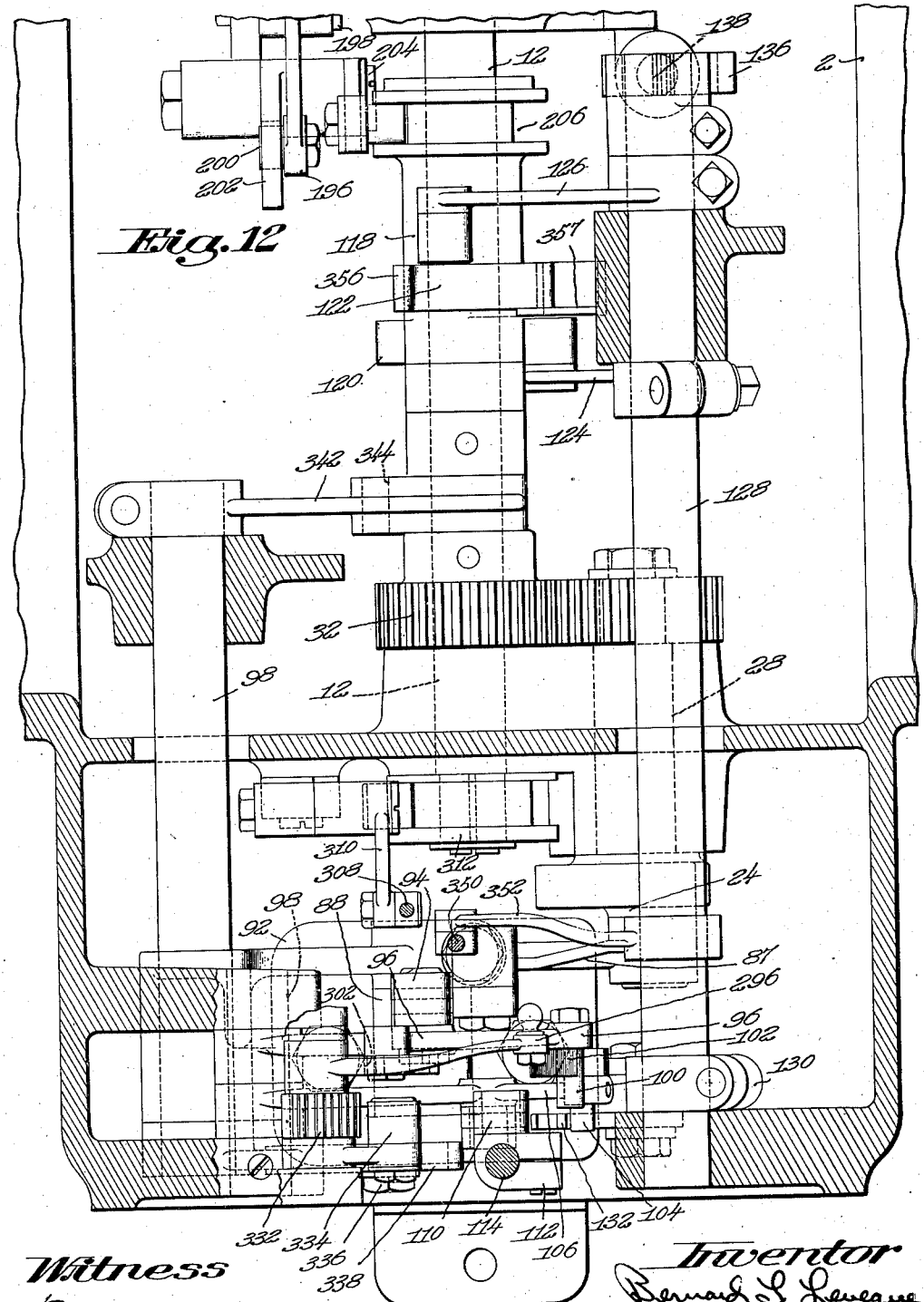
Fig. 12 is a sectional plan view of the lower front portion of the machine illustrated in Fig. 9.

The train of awl-actuating mechanism is generally similar to that for the needle and is best illustrated in Figs. 9, 10 and 12. In addition to the countershaft 28 with its crank 24, the awl-actuating mechanism comprises a pitman 87, one end of which surrounds the crank 24 and the other end of which is pivotally connected to one point on a double-ended arm 88 rotatable on a shaft 90 secured between spaced supports on a bracket 92 mounted within the lower base portion of the machine frame. At another point on the double-ended arm 88 is connected a link 94, the other end of which is connected to a driving lever 96 fulcrumed loosely on a central portion of a horizontal shaft 98 secured in lugs projecting inwardly of the machine frame. When the machine is stopped, the driving lever 96 is free to oscillate without imparting reciprocating movement to the awl. During sewing, a pin 100 carried by the extreme end of the driving lever 96 is engaged by the upper hooked end of a latch link 102 pivoted on a pin 104 secured at the end of a curved awl-actuating lever 106 fulcrumed on the shaft 98 in front of the driving lever 96. To maintain the latch link 102 in engagement with the pin 100, a spring 108 is coiled around a hub on the link and acts to swing the link in a clockwise direction. The actuating lever 106 is in turn pivotally connected through a short link 110 to a block 112 secured to the lower end of a reciprocating awl-supporting bar 114 mounted in vertical bearings in a horizontally movable awl-bar carrier 116, the upper end of the awl bar being provided with a suitable clamping socket for the awl 6.

The driving lever 96, the link 94 and the double-ended arm 88 to which the link is connected, together with the frame of the machine, form a four-bar linkage acting as a toggle, the end pivots of which comprise the fulcrum shaft 90 and the pivotal connection of the link 94 with the driving lever 96 (see Fig. 24). When the central joint of the toggle is brought into alinement with its end pivots, there is a dwell in the reciprocating movement of the awl, the awl being at the upper end of its stroke. This dwell occurs while the awl is engaging and feeding the work so that the awl is held at a position where the shank of the awl is close to the under surface of the work. In this position of the awl, there is little, if any, tendency to bend the awl as a result of resistance of the work against feeding movement, and the length of each stitch is maintained at a high degree of accuracy. The arms of the levers and links going to make up the four-bar linkage for the awl are substantially the same as the corresponding arms of the levers and links in the four-bar linkage for the needle, and the position of the crank 24 with respect to the pitman 87 of the awl mechanism at any given time is the same as the angular position of the needle crank 22 with respect to its pitman 34, so that the resulting movements of the needle and awl are similar and the gap between the points of the needle and awl is kept uniform throughout each sewing cycle.

The shifting mechanism for the awl latch link 102 is so timed that it is moved to unlatching position while the awl is at the lower end of its stroke before the needle latch link 52 is shifted to disconnect the needle. Thus, the awl is brought to rest out of engagement with the work while the needle is in the work, and the needle continues its movement until its operating shaft 10 rotates through 180° and the final stitch of the seam is completed.

For driving the awl latch-shifting mechanism, a timing cam 118 is keyed to, but slidable along, the awl-operating shaft 12 (see Fig. 12). The awl timing cam 118 is formed with axially spaced stop and start surfaces 120 and 122 cooperating with a pair of start and stop control arms 124 and 126, each clamped to a controller shaft 128 mounted in suitable bearings at the right and above the operating shaft 12. The control arms 124 and 126 are spaced along the shaft 128 sufficiently to prevent engagement of more than one arm at a time with the cam 118. At the outer end of the awl-controller shaft is a shift lever 130, the lower end of which is provided with a slotted locking piece 132 and a latch-shifting finger 134 clamped by bolts 135 to opposite sides of the shift lever. The bolts 134 pass through enlarged perforations in the shift lever 130 to enable the locking piece 132 and shifting finger 134 to be adjusted conveniently. The shifting finger is so located that when the actuating lever 106 is in its lowest position, clockwise movement of the shift lever 130 will cause the shifting finger 134 to engage the latch link 102 and swing the latch link clear of the pin 100, thus disconnecting the awl bar from its actuating mechanism. At the same time, the slotted piece 132 engages the outer end of the pin 104 to hold the awl-actuating lever 106 and the awl bar connected thereto in their lowest positions. By the time the needle is disconnected, the final sewing cycle is completed and the thread severed close to the work. In starting the machine in operation, a new work piece is presented to the machine and the operating shafts are caused to rotate until the awl first is connected to its actuating mechanism, and thereafter, when the awl reaches the proper position, the needle is connected so that it will enter the perforation in the work formed by the awl. To hold the awl-controller shaft 128 and shift lever 130 in either starting or stopping position, the rearward end of the shaft 128 has clamped to it a notched segmental retaining arm 136 (see Fig. 24) having projecting fingers to engage the sides of a hollow boss in the machine frame, within which a spring-pressed retaining plunger 138 slides to engage the notches in the arm 136.

To insure that the needle will first be disconnected from its actuating mechanism and thereafter the awl from its actuating mechanism while stopping sewing operations, rather than in the reverse order, the machine of the copending application Serial No. 398,368, now Patent No. 2,352,274, has a slotted timing disk on the main sewing shaft so arranged as to prevent sliding movement of the needle and awl timing cams except at a predetermined point in each sewing cycle. Sliding movement is imparted to the timing cams by treadle connections arranged with a roll actuated by the treadle connections to block the treadle connections against movement except when the slot in the disk registers with the path of the roll. When sewing at high speed, the linear velocity of the timing disk of the machine disclosed in the application is comparatively high, with the result that in some instances a sudden impact may occur if the edge of the slot in the timing disk contacts the roll on the treadle connections unless special care is taken by the operator to actuate the treadle connections quickly and positively in one direction or the other. To avoid the possibility of such impact from a similar cause in the present machine, means is provided for blocking the treadle connections in such a way that in spite of high sewing speeds, contact between a part actuated by the treadle connections and an approaching edge of the blocking means can occur only at relatively low speed.

Accordingly, the means for blocking the treadle connections without undesirable impact comprises a vibrating member in the form of a blocking arm 140 driven by an eccentric 142 on the operating shaft 10 (see Figs. 27 to 35, inclusive). The eccentric 142 is surrounded by an eccentric strap 144 pivotally mounted on a bolt 146 threaded in the vibrating arm 140. The vibrating arm in turn is mounted for oscillation on a shouldered screw 148 fixed in the machine frame. At one end of the vibrating stroke of the arm 140, the treadle connections are free to be moved and, while the vibrating arm is at the other end of its stroke, the treadle connections are blocked, the portion of the stroke at which the edge of the vibrating member moves towards the treadle connections being at the time when the velocity of the arm is relatively low so that possibility of destructive impact is avoided.

As a further means for preventing any possibility of impact in the treadle-actuated connections, the vibrating blocking arm 140 has pivotally mounted on the bolt 146 at its lower end, a spring-pressed finger 150 urged by a spring 152 to a fixed position relatively to the arm 140 with its upper end engaging a projection on the arm. The finger 150 is the element on the vibrating arm with which blocking contact occurs. In case of contact between the finger and the treadle-actuated connections, the spring 152 will enable the finger to yield in one direction and so avoid possibility of impact or breakage.

The treadle connections are yieldingly actuated to slide the timing cams simultaneously along the operating shafts towards and from starting and stopping positions so that, in case the connections are blocked, the connections will yield and move automatically as soon as freed from blocking engagement with the spring-pressed finger 150 on the vibrating arm. Cooperating with the finger 150 to cause the treadle connections to be blocked is a lug 154 secured to one arm of a cam sliding lever 156 rotatably mounted on a horizontal stud screw 158 threaded in the frame of the machine beneath and at right angles to the direction of the screw 148. One arm of the lever 156 pivotally supports a perforated block 160 through which passes a rod 162. At the lower end of the rod 162 is a compression spring 164 confined between the block 160 and a clamp collar 166 on the rod. To limit the expansion of the spring 164, the rod has a clamp collar 168 above the block 160 against which the collar presses when the treadle connections are moved to starting positions. The rod 162 is suspended by a pivot 170 in an arm 172 secured to a horizontal rockshaft 174 rotatably mounted in the machine frame just above the operating shaft 10. One end of the rockshaft 174 extends through the left side of the machine frame and carries outside the frame an arm 176 to which is connected a vertical treadle rod 178. The rod 178 is connected to a treadle (not shown) which, upon depression, moves the rod downwardly and, upon release, enables the rod to be actuated upwardly by a spring 180 coiled around the central part of the rod and compressed between a clamp collar 182 and a stationary guide 184 extending laterally from the frame (see Figs. 1 and 2). The arrangement is such that, while the machine is in operation, the treadle may be released at any time, causing the spring 180 to move the lever 156 of the connections towards stopping position. If the movement of the lever 156 is blocked by engagement of the finger 150 with the lug 154, the pressure of the lug on the finger will be that exerted by the spring 180 only so that there is no possibility of breakage. Upon starting the machine, the lever 156 is moved in the opposite direction unless blocked by the vibrating arm and finger 150, in which case, the spring 164 will yield until the lever 156 is freed for movement.

In order that the treadle-actuated connections may be constructed without excessive weight and stiffness and may be moved quickly to shift the timing cams from starting to stopping positions, and vice versa, with the expenditure of but very little effort on the part of the operator, while at the same time maintaining the timing cams positively in their positions after being shifted, the treadle connections are arranged to lock the cams in their shifted positions. For this purpose, the lever 156 has on its uppermost arm a pin 186 engaging an S-shaped cam slot in one arm of a locking lever 188 fulcrumed on a stud screw 190 and having on its other arm a pin entering a circular slot 192 in the needle timing cam. The S cam slot in the lever 188 is so shaped that, when the lever 156 is moved, the lever 188 will remain stationary until the pin 186 enters the central portion of the cam slot. As illustrated in Fig. 31, movement of the pin 186 will cause the lever 188 first to become unlocked and then the needle timing cam 68 to be moved along the shaft 10.

The awl timing cam is moved along its shaft 12 and locked and unlocked in starting and stopping positions by connections similar to those for actuating the needle timing cam. Extending downwardly from the lowermost arm of lever 156 is a relatively light-weight connecting rod 194 pivotally connected at its ends between the lever 156 and one arm of a lever 196 fulcrumed on a horizontal stud screw 198 threaded in the machine frame (see Figs. 2 and 29). The other arm of the lever 196 is provided with a pin 200 engaging an S-shaped cam slot in one arm of a locking lever 202 fulcrumed on a stud screw 204 and having on its other arm a pin entering a circular slot 206 in the awl timing cam 118. The S cam slot in the lever 202 is shaped similarly to that in the lever 188 to cause the lever 196, when moved, first to unlock the lever 202 and then to slide the awl timing cam 118 along the shaft. At the end of the cam sliding movement, the lever 202 and awl timing cam 118 are again locked in positions.

With the cam-locking levers 188 and 202 locked in their extreme positions, there is no opportunity for forces of reaction set up in the levers during rotation of the timing cams to exert tension or compression on the connecting rod 194 so that this rod, as well as the other treadle connections, may be constructed with sufficient weight only to slide the needle and awl timing cams while no work is being done by them. As soon as the timing cams have rotated sufficiently to bring their active portions into cooperation with the respective control arms, the cams are locked in positions. Lightness in the treadle connections is advantageous not only in providing easily operated controls for the machine, but also in moving the timing cams along their respective shafts with sufficient speed after the treadle connections are released from the blocking arm 140 to insure satisfactory results.

The operation of the needle and awl timing cams and the shapes of their start and stop surfaces, excepting as hereinafter described, is substantially the same as the construction and operation of the corresponding cams in the machine of inventor's prior application above identified, to which reference may be had for a clearer understanding. Briefly, the timing cams are caused to slide simultaneously along their respective shafts from stopped positions to starting positions when the control treadle is depressed. When in starting positions, with the operating shafts rotating, the corresponding start control arms are actuated to rock the controller shafts and shift the respective latch links towards connecting positions. The start surfaces on the timing cams are so formed that the needle and awl controller shafts are rocked in the proper sequence, substantially 180° apart, as measured by the rotation of the operating shafts. The arrangement of the timing cams also is such that the awl controller shaft is rocked first to connect the awl with its actuating mechanism and thereafter the needle is connected to its actuating mechanism. There is a similar sequence and timed relation when the treadle is actuated to bring the timing cams into stopping positions.

In Figs. 21 to 26, inclusive, three positions of the needle and awl controller shafts 78 and 128 are illustrated. With the machine running, the needle controller shaft 78 is maintained in running position by the plunger 86 engaging a notch 208 in the segmental arm 91, as illustrated in Fig. 21. With the controller shaft 78 in the position of this figure, the shift lever 80 is held away from the latch link 52 so that the hooked end of the latch link engages the pin 50 and connects the needle driving lever 42 with the actuating lever 58. While the driving and actuating levers are thus connected, the needle is reciprocated through its regular sewing cycle of movements. The awl controller shaft 128 during sewing operations is maintained in a position with a notch 210 in the segmental arm 136 engaging the retaining plunger 138, the position of the shift lever 130 for the awl latch link being that illustrated in Fig. 9.

When the treadle connections are actuated to slide the timing cams towards stopped positions, the awl is disconnected in its lowermost position disengaged from the work and with the needle engaging the work. The awl latch link 102 is actuated by the shift lever 130 to swing the hooked end of the link away from the pin 100 to disconnect the awl-driving lever 96 from the awl-actuating lever 106. The position of the parts taken while the awl is disconnected is best shown in Fig. 22. After the operating shafts have rotated approximately 100°, the needle is disengaged from the work and brought to its uppermost position, the awl remaining disconnected in its lowermost position, as shown in Figs. 3 and 24. When the operating shafts are rotated a full 180°, the needle controller shaft 78 is rocked sufficiently to bring a notch 212 in the segmental arm 91 into engagement with the retaining plunger 86, the needle controller shaft thereby being rocked to a full stopping position and the slotted piece 82 engaging the pin 56 to hold the needle in its highest position (see Fig. 25). To maintain the awl controller shaft in stopping position, the retaining plunger 138 engages a notch 214 in the segmental arm 134 (see Fig. 24). Continued rotation of the operating shafts thereafter no longer causes reciprocation of either the needle or the awl, and the seam is completed by severing the thread, a loop of which remains on the loop taker 8.

To start the sewing operations on a new work piece, the needle and awl timing cams are caused to slide on their operating shafts towards starting position until the start surfaces of the timing cams are brought into alinement with the respective start control arms on the controller shafts. The start surfaces of the timing cams are so formed that, when the awl-actuating mechanism reaches the position of Fig. 22, the controller shaft 128 will be rocked in a counterclockwise direction so that the latch link 102 will engage the pin 100 on the awl-actuating lever, and the awl will be connected with its operating shaft before the needle is connected. The needle will not be connected to its operating shaft until the position of Fig. 25, is reached, the awl at this time being located at its highest position engaging the work. As soon as the awl begins to withdraw from the work, the needle, being connected, follows it, and the sewing operations will continue in regular order.

The main driving clutch is similar in construction to the clutch in inventor's prior application Serial No. 398,368 and includes a driving member 216 having a belt-receiving groove and a driven member 218 keyed to the rearward end of the needle-operating shaft 10. The driving member is rotatably mounted on a bearing supported by the tubular portion of a cylindrical drum 220 slidably mounted in a close-fitting circular recess surrounding the sewing shaft 10 at the end of the machine frame. To move the driving member towards and from driving relation with the driven member of the clutch, the cylindrical drum 220 is keyed to a pair of studs, one of which is indicated at 222, extending within the machine frame at either side of the operating shaft 10, the heads of which studs are acted upon by a pair of arms 224 secured to the treadle rockshaft 174. When the rackshaft 174 is rotated by depressing the treadle, the clutching-actuating arms 224 act to engage the driving member with the driven member of the clutch after there is sufficient movement to the treadle connections to slide the timing cams into starting positions. By varying the degree of pressure on the treadle, the sewing speed may be changed to suit the conditions of operation.

The work is secured in sewing position against the thrust of the awl operating from beneath the work in a well-known manner. The work rests upon a stationary work support, indicated at 226, and is clamped by a presser foot 228 acting on the upper surface of the work. The work support is in the form of a plate secured to the lower base portion of the enclosing casing 2 and the presser foot is secured to a reciprocating bar 230 slidingly mounted in suitable bearings in the overhanging arm portion of the casing. To bring the presser foot yieldingly against the work during each sewing cycle, the upper end of the presser foot bar is surrounded by a spring 232 engaged at its ends with a shoulder on the bar and a sleeve 234 threaded in the machine frame.

To actuate the presser foot towards and from the work and to lock the presser foot in engagement with the work so that the work may be fed freely and thereafter be secured against movement during formation of each stitch, the third arm of the three-armed lever 36 carries a cam roll 236 (see Fig. 13) engaging a suitably formed cam slot 238 in an arm 240 clamped to the rearward end of the rockshaft 44. The forward end of the rockshaft has clamped to it a slotted arm 242 in the slot of which is adjustably secured a bolt 244 forming the pivotal connection for the upper end of a link 246, the lower end of which is pivoted to a presser foot lock supporting block 248 slidingly mounted on the presser foot bar 230. When the presser foot bar is locked to the block 248, movement of the three-armed lever 36 causes the presser foot to be lifted from or lowered against the work through direct-acting, non-yielding mechanism, the shape of the cam slot 238 being such that positive movements in the two directions occur during dwells while the needle and awl are at the upper end of their reciprocating strokes. During the remainder of each sewing cycle, the presser foot actuating mechanism remains stationary with the presser foot locked in engagement with the work.

The means for locking the presser foot to the lock supporting block is of novel and improved construction particularly effective for high-speed actuation, the time required for locking and unlocking requiring but a relatively small fractional part of each sewing cycle. In certain respects, the mechanism for actuating the presser foot in the present application is similar to that of inventor's copending application Serial No. 412,748, filed September 29, 1941, now Patent No. 2,321,032, granted June 8, 1943, in which is disclosed an oscillating two-way clutch for locking a reciprocating presser foot bar. In order to connect the presser foot bar of said Patent No. 2,321,032 with the oscillating clutch, link connections are required which add inertia to the parts and in turn tend to increase the force required to move the parts with rapidly accelerated motion. Accordingly, a longer time is required to raise and lower the presser foot during each sewing cycle than where the connections are lighter. In the present improved presser foot mechanism, a two-way clutch for locking and unlocking the presser foot acts directly on the presser foot bar without the use of any separate connections between the lock and the bar. Thus, a lighter spring 232 may be employed to urge the presser foot against the work with the certainty of reliable work-clamping action. With the use of a lighter spring, there is less danger of marking or injuring the work from impact during engagement by the presser foot.

Referring to Figs. 15 to 20, inclusive, the presser foot locking clutch is of the two-way roll type yieldingly actuated towards locking position and positively actuated towards released position. The rolls of the clutch are indicated at 250 loosely mounted in an opening within the lock-supporting block 248. The rolls 250 are backed by springs 252 compressed between the rolls and retaining plates 254 removably secured to the supporting block 248. The rolls 250 are moved towards locking positions by the springs which force the rolls along oppositely inclined surfaces towards each other in the supporting block to wedge the rolls against a hardened flat wear plate 256 embedded in a side surface of the presser foot bar 230. To release the presser foot bar, the rolls are forced apart by a wedge 258 fixed to the inner end of a slotted slide 260 movable horizontally in a guideway within the lock-supporting block 248.

To actuate the lock-releasing wedge 258, a pivot 262 having a central eccentric disc portion passes through the slot in the slide 260 and has its ends mounted in bearings in the sides of the supporting block outside of the slide 260 (see Fig. 20). Clamped to the rearward end of the pivot 262 is a trigger 264 projecting into the path of a trip finger 266 the hooked portion of which is shaped to retain the trigger 264 while the lock-supporting block 248 is descending towards the work (see Fig. 16). When the trigger is engaged by the hooked end of the trip finger at the end of the descent of the lock-supporting block, the eccentric disc portion on the pivot 262 presses the wedge slide 260 towards the presser foot bar and separates the rolls 260 (Fig. 17) to unlock the presser foot bar and to enable the presser foot to engage the work yieldingly.

The trip finger 266 is pivotally supported by a screw 268 in a lug on the needle-driving lever 42. After releasing the lock, the trip finger is moved away from the trigger by the engagement of a stop on the trip finger with a projection 270 on the lever 42. To hold the trip finger in a position where it will engage the trigger, the screw 268 is surrounded by a coiled spring 272 acting at one end on the needle-actuating lever and at the other end on the trip finger, the trigger being beveled at its outer end to hold the trip finger out of the path of the trigger (Fig. 15) during upward movement of the lock-supporting block and presser foot. The presser foot actuating and locking mechanism is so adjusted that the presser foot bar is released from the lock only after the presser foot has been lowered substantially into engagement with the work. In this way, little or no movement of the presser foot bar from the force of the presser foot spring 232 occurs after the presser foot engages the work. As a result, the presser foot may be operated at relatively high speeds with minimum reliance upon the force of the spring 232 to bring the presser foot accurately against the work.

For lifting the presser foot from engagement with the work after a seam has been completed in order that the work may be withdrawn from the machine, the presser foot is first unlocked and a roll 274 projecting forwardly from the presser foot bar is engaged by a lever 276 pivotally mounted on a fixed screw 278 (see Figs. 13 and 14). The left end of the lever has clamped to it a block 280 supporting a lock-releasing roll 282 acting when raised against a cam surface on an arm 284 secured to the forward end of the eccentric pivot 262 of the presser foot lock to release the presser foot bar from the lock. One arm of the lever 276 is connected to a toggle comprising a link 286 and an arm 288 fast to the forward end of the needle controller shaft 78. With the controller shaft in starting position, the toggle is broken with the central joint out of alinement with the end pivots (Fig. 13) and the roll 282 and its actuating lever are held in lowered position out of engagement with the lock-releasing arm 284 and the presser foot lifting roll 274. When the controller shaft is rocked to stopping position, the parts assume the relations illustrated in Fig. 14. To insure that the presser foot locking rolls will engage the plate on the presser foot bar, a downwardly extending lug on the releasing arm 284 is connected to one end of a tension spring 287, the other end of which is made fast to a lug on the lower end of the link 246, a stop lug being provided on the lock-releasing arm 284 to engage the supporting block 248 and limit the movement of the lock-releasing arm 284 under the action of the spring 287.

Figure 36:
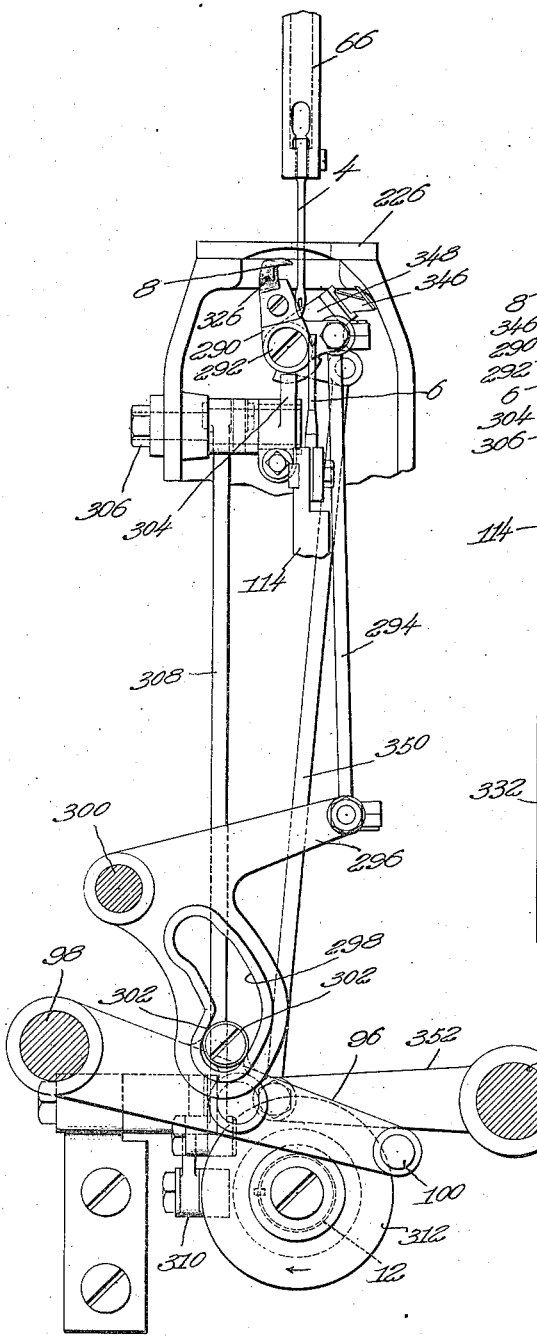
Fig. 36 is a detail view in front elevation of the looper-actuating mechanism, indicating the positions of parts while the looper is about to enter a loop of thread carried by the needle.
Figure 37:
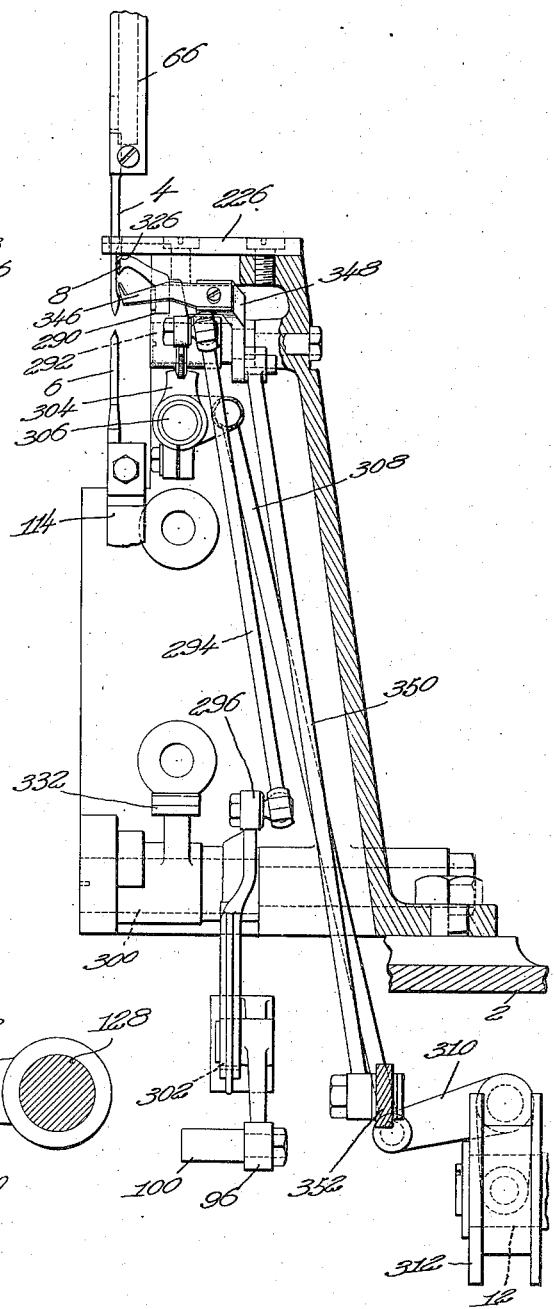
Fig. 37 is a sectional view, looking from the right side of the machine, of the same parts in the positions illustrated in Fig. 36.

The loop taker 8, as embodied in the present machine, is in the form of a hooked finger, the point or beak of which is directed to enter a recess in one side of a needle 4 while moving against the direction of work feed to take off the needle loop, and the loop taker is so actuated that the needle loop will not be entered or the thread engaged at any time by the point of the awl, in spite of the relatively short gap between the points of the needle and awl. The loop taker, as viewed in Figs. 36 and 37, is mounted on a lever 290 having a hub rotatable on an elongated cylindrical head on a bolt 292 secured in the machine frame beneath the work support 226. To oscillate the loop taker, one arm of the lever 290 is connected, by means of a ball and socket joint, to the upper end of a link 294 similarly connected at its lower end to one arm of a lever 296, the other arm of which is provided with a cam slot 298. The lever 296 is fulcrumed on a shaft 300 secured in the machine frame above the awl-driving lever 96. The awl-driving lever 96 is provided with a roll 302 projecting within the cam slot 298 to impart movement to the lever and to oscillate the loop taker.

In order to carry each loop received from the needle out of the path of the awl and to prevent contact between the thread in the needle loop with the point of the needle or awl, the loop taker is shifted axially along the bolt 292 as soon as it receives the loop. To shift the loop taker, the hub of the loop taker lever 290 is formed with a radial flange projecting into a notch of a lever 304 rotatable on the enlarged portion of a bolt 306 mounted beneath and at right angles to the bolt 292. Another arm of the lever 304 is pivotally connected through a link 308 to one arm of a cam lever 310 having a roll acted upon by a loop-taker shifting cam 312 keyed to the forward end of the awl-operating shaft 12. The development of this cam, shown in Fig. 11, causes proper shifting movement, as indicated in this figure and more fully described hereinafter, to be imparted to the loop taker to carry each needle loop rearwardly away from the path of the awl as it enters the work.

The operation of the needle, awl and loop taker will be clearly understood from an inspection of Figs. 11 and 38 to 50, inclusive. Starting with the parts in the positions of Figs. 38 and 41, with the needle engaging the work at the lowermost end of its stroke, the loop taker is held in alinement with the recess of the needle by the portion 314 of the cam 312 (Fig. 11). During this portion of the cam 312, the loop taker is actuated to enter the needle loop, the needle being retracted a short distance to open out the loop. As soon as the point of the loop taker enters the needle loop, the loop taker is shifted rearwardly by the cam portion 316 to prevent engagement of the thread with the awl which is starting to rise towards the work, as illustrated in Figs. 39 and 42. The awl then enters the work a stitch length away from the needle path and, while the awl is entering, the needle is withdrawing (Figs. 40 and 43), the awl remaining in contact with the work until after the needle enters the upper end of the awl perforation. A dwell portion 318 of cam 312 is at this time holding the loop taker and needle loop out of the awl path. The previously formed stitch is set when the needle reaches the upper end of its stroke, the thread extending in line from the work to the needle so that the tension on the thread has no tendency to bend the needle to one side. As soon as the awl reaches its highest position, the presser foot is raised from engagement with the work, and the awl is fed a stitch length to bring the awl perforation into line with the needle path, the loop taker still remaining shifted rearwardly to hold the thread out of the path of the awl. During feed of the work, the awl remains in its highest position and begins to withdraw when the presser foot again clamps the work (see Figs. 44 and 47). As the awl and needle descend, the loop taker is shifted forwardly at 329 of the cam 312 to deflect the forward side of the needle loop against the awl, as illustrated in Fig. 50. At approximately the same time the point of the awl being withdrawn from the work passes the forward deflected side of the needle loop; the loop snaps across the gap between the points of the needle and awl. When this occurs, the awl is moving with sufficient speed to prevent the point of the awl from cutting or injuring the thread. After snapping across the gap between the needle and awl, the loop held by the loop taker is brought by the cam portion 322 into alinement with the needle path, as shown in Fig. 48, so that the needle, following closely behind the awl, may enter readily into the loop (Figs. 45 and 48). The movement of the loop taker to deflect the thread against the awl, as indicated in Fig. 50, before the awl withdraws from the work, avoids the necessity of close timing in the stitch-forming devices and enables different lengths of needles and awls to be employed without requiring careful adjustments in the actuating mechanisms.

The loop taker is actuated in other respects in a manner to avoid contact with the needle, after being shifted to bring the loop directly under the needle. While actuated by a portion 324 of the loop taker cam 312, the loop taker is oscillated in the direction of feed to release the previously held needle loop and is shifted further rearwardly to the position of Fig. 41 to bring the point of the loop taker into alinement with the recess in the side of the needle. After the point of the loop taker has entered a new needle loop, it is shifted immediately rearwardly by the cam portion 316 away from the needle and awl paths so that the needle may be retracted from the work without accidental contact with the the loop taker.

In order to hold each needle loop in a spread position at which the needle readily may enter, and to avoid engagement of the rearward side of the loop with the needle point so as to cause stranding of the thread, the rearward side of the needle loop is held at a higher level than the forward side, as illustrated in Fig. 45. After the forward side has snapped across the gap between the needle and awl, the point of the needle has reached a position at the same level or slightly below the level of the rearward side of the loop, thus preventing contact of the rearward side with the needle point. For supporting the needle loop in this way on the loop taker, the forward side of the loop taker at the root of the loop taker point is formed with a grooved shoulder 326, the groove in which is spaced a suitable distance below the upper surface of the loop taker.

The awl bar carrier 116 is slidably mounted upon a pair of parallel horizontal rods 328 and 330 secured at their ends in the machine frame, and the carrier is actuated to feed the work through mechanism including a gear segment 332 engaging teeth formed along the lower edge of the carrier. The gear segment 332 comprises an arm of a bell crank rotatably mounted on the shaft 300, the other arm of which bell crank is pivotally connected to the upper end of a link 334 having at its lower end a pivot bolt 336 adjustably clamped within an arcuate slot of an arm 338 fast on a shaft 340. The shaft 340 is loosely supposed in a bearing of the bracket 92 and extends rearwardly of the machine frame through an alined bearing in the frame. At the rearward end of the shaft is clamped a forked arm 342, the fork of which surrounds a feed cam 344 on the awl-operating shaft 12.

For severing the thread while the needle loop remains on the loop taker, a thread cutter is provided in the form of a hooked knife 346 constructed and actuated to engage and sever the rearward side of the needle loop close to the under surface of the work support at the end of the seam while the loop taker holds the loop in its rearwardly shifted position. The thread cutter is secured to a lever 348 rotatable on a reduced portion of the bolt 292 between the enlarged portion on the bolt and a hub on the machine frame in which the bolt is clamped. The thread cutter is sharpened along its thread-engaging hooked edge and arranged to be actuated across the path of the rearward side of the needle loop while the loop taker is shifted to its rearwardmost position, thus bringing the rearward side of the loop with certainty into the path of the thread cutter. With the needle loop drawn rearwardly by the thread cutter while being severed, there is a better opportunity for proper engagement of the thread cutter with the thread and less chance for the thread cutter to come into contact with the needle and awl by reason of improper actuation or adjustments of the stitch-forming devices. The active position of the thread cutter is illustrated in Figs. 46 and 49 and the thread-cutter actuating mechanism in Figs. 36 and 37.

For actuating the thread cutter, the thread cutter lever 348 is pivotally connected with the upper end of a rod 350, the lower end of which is connected to an arm 352 (Figs. 36 and 37) secured to the awl controller shaft 128. The arrangement of the connections with the thread cutter causes the thread cutter to be moved from an inoperative position (Fig. 36) during sewing to an operative position somewhat closer to the work when the awl controller shaft is actuated to stop position, as in Fig. 24, in which the retaining plunger 138 engages the stop notch 214. At this point in the rotation of the awl-operating shaft 12, the awl is disconnected but the stop surface on the awl timing cam is extended and provided with an enlargement 356 (see Figs. 29, 33 and 34) to rock the controller shaft still farther beyond its stop position. When the stop control arm engages the enlargement 356 on the awl timing cam, the controller shaft 128 is rocked sufficiently to cause the thread cutter to engage and sever the thread, the retaining plunger being forced out of the stop notch 214. To prevent the stop controller arm from being forced outwardly beyond the position of the controller shaft where the retaining plunger engages the notch 214, while the awl is being disconnected, the first active portion of the stopping surface on the awl timing cam is covered by a shield 357 (see Fig. 35) spaced sufficiently to limit the movement of the stop control arm and hold it in stop position until the enlargement 356 on the stopping surface is reached.

Referring to Fig. 4, the sewing thread, indicated at 358, passes from a suitable source of supply and is carried at least a single turn around a tension wheel 360. The tension wheel 360 is rotatably mounted in a bracket 362 located on the upper surface of the overhanging frame arm. From the tension wheel, the thread is carried beneath a thread-measuring finger 364 and over an angular take-up member 366 clamped to the upper end of the hollow needle bar 66 (see Figs. 1, 6, 7 and 8). The thread passes along the upper surface of the member 366 and downwardly through the hollow of the needle bar, emerging through an opening 368 in the needle bar at its lower end.

To enable the work to be fed without resistance from tension in the thread after each stitch is set, the tension on the thread is relieved during the work-feeding movement of the awl. To this end, the presser foot bar 230 has clamped to its upper end an adjustable block 370 acting, when the presser foot is raised, to engage a forwardly extending tension wheel brake arm 372. The brake arm 372 is pivotally supported on a screw 374 threaded in the tension wheel bracket 362 and is formed with a semicylindrical concavity within which rotates the upper half of a hollow-headed stud 376 forming a gudgeon for the tension wheel. The lower half of the stud rotates in a similar concavity of the bracket 362. To maintain a uniform braking pressure on the stud 376, the arm is acted upon by an adjustable compression spring 378 surrounding a rod 380, the lower end of which is supported in the bracket 362 and the upper end of which is threaded to receive a nut 382 engaging the spring 378.

When the presser foot is lifted from engagement with the work during each stitch-forming cycle, the block 370 raises the brake arm 372 and compresses the spring 378 so that substantially no tension is imparted to the thread. At the end of the feeding movement when the presser foot is again lowered, the brake arm 372 again acts to resist rotation of the tension wheel. The block 370 on the presser foot bar 230 may be raised and lowered to change the time in a sewing cycle when the tension is released or reapplied and is provided with a slotted arm surrounding the flat-sided upper end of a fixed bar 384 which acts to prevent rotation of the presser foot bar in its bearings on the machine frame.

The take-up member 366 on the needle bar acts together with the hooked upper end of a vertical arm 386 secured to the machine frame in a manner generally similar to a corresponding member of a machine disclosed in inventor's United States Letters Patent No. 1,864,510, granted June 21, 1932. The take-up member 366 has a perforated horizontal flange through the perforation of which the arm 386 passes. The arm 386 has a light, vertical spring strip 388 forming with the arm 386 an elongated, restricted opening through which the thread passes, the arrangement being such that the greatest amount of pressure is exerted by the spring 388 on the thread near the upper end of the needle bar stroke where each stitch is set at the position of Fig. 7. As the needle begins to descend, the thread crossing the opening in the member 366 is drawn downwardly between the arm and the spring, the spring imparting tension to the thread sufficient only to maintain proper control during formation of the stitch.

The thread-measuring finger 364 of the present machine is actuated during sewing to cause thread to be drawn past the tension wheel directly after each stitch is set in an amount required by the varying thicknesses of the work to insure proper formation of a tight stitch. For thus actuating the thread-measuring finger, the finger is actuated through motion-reversing connections from the presser foot. The finger is clamped to the upper end of a vertically reciprocating rod 390 passing through a bearing in the upper wall of the overhanging frame arm and having a laterally extending pin 392 at its lower end within the enclosing casing of the machine frame. Surrounding the pin 392 is a forked end of an arm 394 formed integrally with a short horizontal shaft 396 rotatable in a fixed bearing block 398. To secure the shaft 396 in the bearing block and to rotate it, the forward end has clamped to it an arm 400 connected through a link 402 to a pin which supports the roll 274 on the presser foot bar 230. When the presser foot bar is raised to release the work for feeding movement and while the needle bar is in its highest position, the thread-measuring finger 364 is moved to its lowered position to withdraw a supply of thread from the tension wheel. The movement of the presser foot bar is uniform while releasing the work regardless of the thickness of the work and its lowest position while in engagement with the work is dependent upon the work thickness so that more thread is pulled off by the measuring finger with thick work than with thin work. The pull-off movement of the measuring finger occurs directly after each stitch is set to provide thread in addition to that drawn from the tension wheel by the take-up in setting the stitch. When operating upon thin or relatively soft types of work, it is not always necessary to actuate the thread-measuring finger 364 to pull off an extra supply of thread so that the finger may be unclamped and raised on the rod 390 a sufficient distance to avoid contact with the thread.

Certain features of the invention relating to the presser foot mechanism form the subject matter of a divisional application for United States Letters Patent Serial No. 607,292, filed July 27, 1945, and patented October 1, 1946, No. 2,408,523.

The nature and scope of the invention having been indicated and a particular embodiment having been described, what is claimed is:

1. A sewing machine having, in combination, work penetrating instruments including a straight needle and a straight awl active from opposite sides of the work, and separate trains of mechanism for actuating the needle and awl, comprising spaced operating shafts, a countershaft operatively connected with each operating shaft and rotatably mounted in eccentric relation thereto, and driving connections between the countershafts and the needle and awl.

2. A sewing machine having, in combination, work penetrating instruments including a straight needle and a straight awl active from opposite sides of the work, and separate trains of mechanism for actuating the needle and awl, comprising spaced operating shafts, a countershaft operatively connected with each operating shaft and rotatably mounted in eccentric relation thereto, and driving connections between the countershafts and the respective work penetrating instruments including an element movable to disconnect each work penetrating instrument from the corresponding countershaft.

3. A sewing machine having, in combination, work-penetrating instruments including a straight needle and a straight awl acting from opposite sides of the work, spaced operating shafts and separate trains of mechanism, respectively, for actuating the needle and awl comprising a set of motion-modifying connections in the space surrounding the end of each operating shaft, an element in said connections movable to disconnect each work-penetrating instrument from its operating shaft, a pitman for imparting movement to said connections, and a crankshaft for each pitman driven from and rotatably mounted in off-center parallel relation to each operating shaft.

4. A sewing machine having, in combination, work-penetrating instruments including a straight needle and a straight awl acting from opposite sides of the work, spaced operating shafts and separate trains of mechanism, respectively, for the needle and awl comprising the operating shafts, a crankshaft driven from and rotatably mounted in off-center parallel relation to each operating shaft, a pitman connected to each crankshaft, and a four-bar linkage connected between the pitman and each work-penetrating instrument.

5. A sewing machine having, in combination, work-penetrating instruments including a straight needle and a straight awl acting from opposite sides of the work, spaced operating shafts and separate trains of mechanism, respectively, for the needle and awl comprising the operating shafts, a crankshaft driven from and rotatably mounted in off-center parallel relation to each operating shaft, a pitman connected to each crankshaft, a four-bar linkage connected between the pitman and each work-penetrating instrument, an element movable to disconnect each work-penetrating instrument from its pitman, and means on one of the operating shafts for shifting the movable elements.

6. A sewing machine having, in combination, work-penetrating instruments including a straight needle and a straight awl acting from opposite sides of the work, spaced operating shafts and separate trains of mechanism, respectively, for the needle and awl comprising the operating shafts, a crankshaft driven from and rotatably mounted in off-center parallel relation to each operating shaft, a pitman connected to each crankshaft, a four-bar linkage connected between the pitman and each work-penetrating instrument, an element movable to disconnect each work-penetrating instrument from its pitman, and means on both operating shafts for shifting both movable elements at different times in each sewing cycle.

7. A sewing machine having, in combination, work-penetrating instruments including a straight needle and a straight awl acting from opposite sides of the work, spaced operating shafts and separate trains of mechanism, respectively, for the needle and awl comprising the operating shafts, a crankshaft driven from and rotatably mounted in off-center parallel relation to each operating shaft, a pitman connected to each crankshaft, a four-bar linkage connected between the pitman and each work-penetrating instrument, an element movable to disconnect each work-penetrating instrument from its pitman, timing cams slidable on the operating shafts for shifting the movable elements, and a vibrating member driven by one of the operating shafts for preventing sliding movement of the timing cams except in a predetermined position of one of the work-penetrating instruments.

8. A sewing machine having, in combination, work-penetrating instruments including a straight needle and a straight awl acting from opposite sides of the work, spaced operating shafts and separate trains of mechanism, respectively, for the needle and awl comprising the operating shafts, a crankshaft driven from and rotatably mounted in off-center parallel relation to each operating shaft, a pitman connected to each crankshaft, a four-bar linkage connected between the pitman and each work-penetrating instrument, an element movable to disconnect each work-penetrating instrument from its pitman, timing cams slidable on the operating shafts for shifting the movable elements, an eccentric on one of the operating shafts, a vibrating member driven by the eccentric, a treadle-actuated rod, yielding connections between the treadle rod and the timing cams for sliding the timing cams on the sewing shafts, and a lug on one of the yielding connections arranged in the path of the vibrating member to prevent sliding movement of the timing cams except with one of the work-penetrating instruments in a predetermined position.

9. A sewing machine having, in combination, work-penetrating instruments including a straight needle and a straight awl acting from opposite sides of the work, spaced operating shafts and separate trains of mechanism, respectively, for the needle and awl comprising the operating shafts, a crankshaft driven from and rotatably mounted in off-center parallel relation to each operating shaft, a pitman connected to each crankshaft, a four-bar linkage connected between the pitman and each work-penetrating instrument, an element movable to disconnect each work-penetrating instrument from its pitman, timing cams slidable on the operating shafts for shifting the movable elements, an eccentric on one of the operating shafts, a vibrating member driven by the eccentric, a treadle-actuated rod, yielding connections between the treadle rod and the timing cams for sliding the timing cams on the sewing shafts, a lug on one of the yielding connections, and a spring-pressed finger on the vibrating member for blocking the lug to prevent sliding movement of the timing cams on the operating shafts while the operating shafts are in any angular positions except those in which the movable elements of the trains of mechanisms are to be connected or disconnected.

10. A sewing machine having, in combination, work-penetrating instruments including a straight needle and a straight awl, spaced operating shafts, and separate trains of mechanism for actuating the needle and awl, an element movable to disconnect each work-penetrating instrument from the respective operating shaft, a slidable timing cam on each operating shaft and a follower cooperating therewith for shifting each element to disconnect and connect the needle and awl, a treadle-actuated rod, and means connecting the treadle rod and timing cams for locking the cams in position on the operating shafts relatively to the followers after being moved in either direction.

11. A shoe sewing machine having, in combination, a work-penetrating needle, an operating shaft, and mechanism driven from the operating shaft for actuating the needle comprising an element movable to disconnect the needle, a timing cam on the operating shaft and a cooperating follower relatively movable to bring the timing cam into and out of cooperative relation with the follower, connections between the follower and the needle disconnecting element, a treadle-actuated rod for moving the cam relatively to the follower, and means for locking the cam against movement relatively to the follower.

12. A sewing machine having, in combination, work-penetrating instruments including a straight needle and a straight awl, spaced operating shafts, and separate trains of mechanism for actuating the needle and awl, an element movable to disconnect each work-penetrating instrument from the respective operating shaft, a slidable timing cam on each operating shaft and a follower cooperating therewith for shifting each element to disconnect and connect the needle and awl, a treadle-actuated rod, connections actuated by the treadle rod for moving both cams relatively to their respective followers simultaneously including means for locking the cams against movement in either of two positions relative to the followers, and means for preventing relative movement of the cams and followers until the cams reach predetermined angular positions.

13. A sewing machine having, in combination, work-penetrating instruments including a straight needle and a straight awl, spaced operating shafts, and separate trains of mechanism for actuating the needle and awl, an element movable to disconnect each work-penetrating instrument from the respective operating shaft, a slidable timing cam on each operating shaft and a follower cooperating therewith for shifting each element to disconnect and connect the needle and awl, a treadle-actuated rod, means connecting the treadle rod and timing cams for locking the cams in position on the operating shafts relatively to the followers after being moved in either direction, and means for preventing the cams from being unlocked except when the operating shaft is in a predetermined angular position.

14. A shoe sewing machine having, in combination, stitch-forming devices including a needle, an operating shaft and a train of mechanism for actuating the needle comprising a latch link movable to disconnect the needle from the operating shaft, a latch-shifting lever, a locking piece for holding the needle-actuating mechanism stationary when disconnected, a shifting finger for engaging the latch link to disconnect the needle, and means for adjustably clamping the locking piece and shifting finger to the shifting lever.

15. A shoe sewing machine having, in combination, stitch-forming devices including a needle, an operating shaft and a train of mechanism for actuating the needle comprising a latch link movable to disconnect the needle from the operating shaft, a latch-shifting lever, a locking piece for holding the needle-actuating mechanism stationary when disconnected, a shifting finger for engaging the latch link to disconnect the needle, and bolts passing through enlarged openings in the shifting lever adjustably to clamp the locking piece to one side of the shifting lever and the shifting finger to the opposite side of the shifting lever.

16. A sewing machine having, in combination, an eye-pointed needle at one side of the work, an awl at the other side of the work, operating to form a needle-receiving perforation in the work, and a loop taker at the side of the work with the awl, arranged and actuated to enter a loop of needle thread while the needle engages the work and to carry the loop received from the needle out of the path of the awl before the awl enters the work.

17. A sewing machine having, in combination, an eye-pointed needle at one side of the work, an awl at the other side of the work, operating to form a needle-receiving perforation in the work, a loop taker at the side of the work with the awl, and mechanisms for actuating the loop taker to enter a loop of needle thread while the needle engages the work and to carry the loop received from the needle out of the path of the awl before the awl enters the work and into the path of the needle as the awl withdraws from the work.

18. A sewing machine having, in combination, an eye-pointed needle at one side of the work, an awl at the other side of the work, operating to form a needle-receiving perforation in the work, a loop taker at the side of the work with the awl, mechanism for actuating the loop taker to enter a loop of needle thread while the needle engages the work, and mechanism for shifting the loop taker to carry the loop received from the needle out of the path of the awl before the awl enters the work and to deflect one side of the loop against the side surface of the awl as the awl withdraws from the work, causing the thread to snap through the gap between the needle and the awl when the point of the awl passes the deflected thread.

19. A shoe sewing machine having, in combination, work-penetrating instruments including a straight needle and a straight awl acting from opposite sides of the work, spaced operating shafts, a train of mechanism driven from one of the operating shafts to actuate the needle, a train of mechanism comprising a countershaft driven from the other operating shaft and rotatably mounted in off-center relation to said other operating shaft to actuate the awl, a loop taker at the side of the work with the awl, mechanism driven by the awl-operating shaft for actuating the loop taker to enter a loop of needle thread while the needle engages the work, and mechanism driven by said awl-operating shaft for shifting the loop taker to carry the loop received from the needle out of the path of the awl before the awl engages the work and into the path of the needle as the awl withdraws from the work.

20. A shoe sewing machine having, in combination, an eye-pointed needle at one side of the work, an awl at the other side of the work, mechanism for actuating the awl to form a perforation in the work in line with the needle and to remain in contact with the work in each sewing cycle until after the needle has entered the same perforation with the awl, mechanisms for actuating the awl to feed the work and to move in a direction opposite to the work feed after the needle enters the work and before the awl reengages the work in a new sewing cycle, and a loop taker at the side of the work with the awl arranged and actuated by movement in a direction opposite to work feed to enter each loop of thread carried by the needle after the needle enters the work and to carry the loop received from the needle transversely of the direction of feed out of the path of the awl before the awl enters the work.

21. A sewing machine having, in combination, an eye-pointed needle at one side of the work, an awl at the other side of the work, operating to form a needle-receiving perforation in the work a stitch length from the needle, mechanism for actuating the awl while engaging the work to bring the awl perforation into line with the needle and in a direction opposite to work feed to back feed the awl before the needle withdraws from the work, a pointed loop taker acting at the side of the work with the awl, the point of the loop taker facing in a direction opposite to work feed to enter each loop of thread carried by the needle after the needle enters the work, and mechanism for actuating the loop taker transversely to the direction of feed to bring the loop out of the path of the awl before the awl enters the work.

22. A sewing machine having, in combination, an eye-pointed needle at one side of the work, an awl at the other side of the work, operating to form a needle-receiving perforation in the work, a loop taker at the side of the work with the awl, a loop-taker supporting stud, and mechanisms for oscillating the loop taker about the supporting stud to cause the loop taker to enter a loop of needle thread and for shifting the loop taker lengthwise of the stud to carry the loop received from the needle out of the path of the awl before the awl enters the work in each new sewing cycle.

23. A sewing machine having, in combination, an eye-pointed needle at one side of the work, an awl at the other side of the work, operating to form a needle-receiving perforation in the work, a loop taker at the side of the work with the awl having a needle-loop-entering point and a shoulder at the root of the point arranged to support one side of a needle loop at a different level from the opposite side of the loop, and mechanisms for actuating the loop taker to carry each loop received from the needle out of the path of the awl before the awl enters the work and to deflect the lower side of the loop against the side surface of the awl as the awl withdraws from the work, the gap between the points of the needle and awl being such as to cause the point of the needle to pass the level of the higher side of the needle loop when the deflected lower side clears the point of the awl.

24. A shoe sewing machine having, in combination, a straight needle, a reciprocating needle-supporting bar, a thread tension, a work support, a presser foot acting with the work support to clamp the work, a reciprocating presser-foot bar, a take-up member on the needle bar, a thread-measuring finger, and motion reversing connections between the presser-foot bar and the thread-measuring finger to cause a supply of thread to be drawn past the tension varying with different thicknesses of work.

25. A shoe sewing machine having, in combination, a straight needle, a reciprocating needle-supporting bar, a thread tension, a work support, a presser foot acting with the work support to clamp the work, a reciprocating presser-foot bar, a take-up member over which the thread passes on the needle bar, a thread-measuring finger beneath which the thread passes, and motion-reversing connections between the presser-foot bar and the thread-measuring finger for increasing the amount of thread drawn past the tension with increasing thicknesses of work.

26. A sewing machine having, in combination, means for supporting and feeding the work, stitch-forming devices including an eye-pointed needle, a loop taker cooperating with the needle to form a chain-stitch seam in the work, an operating shaft, and suitable mechanism for actuating the stitch-forming devices from the operating shaft including disconnectible connections, a controller for disconnecting said connections, a cam on the operating shaft for actuating the controller, a treadle rod for rendering the cam effective or ineffective to actuate the controller, and a thread cutter actuated by the controller to sever the thread in the final stitch of a seam.

27. A sewing machine having, in combination, an eye-pointed needle at one side of the work, an awl at the other side of the work, operating to form a needle-receiving perforation in the work, a loop taker at the side of the work with the awl arranged and actuated to enter a loop of needle thread while the needle engages the work and to carry the loop received from the needle out of the path of the awl before the awl enters the work, and a thread cutter actuated to sever the thread in the final loop while held out of the path of the awl.

28. A sewing machine having, in combination, an eye-pointed needle at one side of the work, an awl at the other side of the work, operating to form a needle-receiving perforation in the work, a loop taker at the side of the work with the awl arranged and actuated to enter a loop of needle thread while the needle engages the work and to carry the loop received from the needle out of the path of the awl before the awl enters the work, an operating shaft, mechanism for actuating the needle and awl including disconnectible connections, a controller for connecting and disconnecting said connections, a treadle rod for causing the controller to be actuated, and a thread cutter connected to the controller and actuated while the awl is being disconnected from the operating shaft and the final loop is being held out of the path of the awl to sever the thread in said loop.

29. A sewing machine having, in combination, an eye-pointed needle at one side of the work, an awl at the other side of the work, operating to form a needle-receiving perforation in the work, a loop taker at the side of the work with the awl arranged and actuated to enter a loop of needle thread while the needle engages the work and to carry the loop received from the needle out of the path of the awl before the awl enters the work, an operating shaft, mechanisms for actuating the needle and awl from the operating shaft including disconnectible connections, a controller actuated to an intermediate position between two extreme positions to disconnect the awl from the operating shaft, a treadle rod for causing the controller to be actuated, and a thread cutter connected to the controller and actuated while the controller is moving from its intermediate position to one of the extreme positions to sever the thread in the final loop of a seam while held out of the path of the awl.

30. A sewing machine having, in combination, an eye-pointed needle at one side of the work, an awl at the other side of the work, operating to form a needle-receiving perforation in the work, a loop taker at the side of the work with the awl arranged and actuated to enter a loop of needle thread while the needle engages the work and to carry the loop received from the needle out of the path of the awl before the awl enters the work, an operating shaft, mechanisms for actuating the needle and awl from the operating shaft including disconnectible connections, a controller actuated to an intermediate position between two extreme positions to disconnect the awl from the operating shaft, a cam on the operating shaft for moving the controller, a treadle rod for causing the cam to move the controller from an extreme position to its intermediate position, and for thereafter moving the controller from its intermediate position to the other extreme position, and a shield on the cam for preventing the controller from being moved beyond the second-mentioned extreme position until actuated by the cam.

BERNARD T. LEVEQUE.

REFERENCES CITED

The following references are of record in the file of this patent:

UNITED STATES PATENTS

| Number | Name | Date |
| --- | --- | --- |
| 377,466 | Richardson | Feb. 7, 1888 |
| 1,605,060 | Oliver | Nov. 2, 1926 |
| 1,981,868 | Lawson | Nov. 27, 1934 |
| 2,352,274 | Leveque | June 27, 1944 |